United States Patent
Jones et al.

(10) Patent No.: US 12,067,606 B2
(45) Date of Patent: Aug. 20, 2024

(54) REAL-TIME PROVISIONING OF TARGETED, ALTERNATIVE PRODUCT INFORMATION BASED ON STRUCTURED MESSAGING DATA

(71) Applicant: The Toronto-Dominion Bank, Toronto (CA)

(72) Inventors: Christopher Mark Jones, Villanova, PA (US); Barry Wayne Baird, Jr., Kennett Square, PA (US); Claude Bernell Lawrence, Jr., Philadelphia, PA (US); Jonathan Joseph Prendergast, West Chester, PA (US)

(73) Assignee: The Toronto-Dominion Bank, Toronto (CA)

( * ) Notice: Subject to any disclaimer, the term of this patent is extended or adjusted under 35 U.S.C. 154(b) by 200 days.

(21) Appl. No.: 17/546,422

(22) Filed: Dec. 9, 2021

(65) Prior Publication Data
US 2022/0198543 A1 Jun. 23, 2022

Related U.S. Application Data

(60) Provisional application No. 63/126,698, filed on Dec. 17, 2020.

(51) Int. Cl.
*G06Q 30/00* (2023.01)
*G06Q 20/32* (2012.01)
*G06Q 30/0601* (2023.01)

(52) U.S. Cl.
CPC ..... *G06Q 30/0631* (2013.01); *G06Q 20/3255* (2013.01)

(58) Field of Classification Search
None
See application file for complete search history.

(56) References Cited

U.S. PATENT DOCUMENTS 6,029,150 A 2/2000 Kravitz
7,184,989 B2 2/2007 Hansen et al.
(Continued)

FOREIGN PATENT DOCUMENTS

| AU | 2013206122 | 7/2014 |
| CA | 301 4693 | 2/2020 |

(Continued)

OTHER PUBLICATIONS

STIC Search Report, Oct. 12, 2023 (4 pages).
(Continued)

*Primary Examiner* — Mila Airapetian
(74) *Attorney, Agent, or Firm* — Duane Morris LLP

(57) ABSTRACT

The disclosed embodiments include computer-implemented systems and processes that provision targeted alternative product information based on structured messaging data. For example, an apparatus may receive a message that characterizes a real-time payment requested by a first counterparty from a second counterparty, and is associated with a first product provisioned to the second counterparty by the first counterparty. The apparatus may determine that a second product is available to the second counterparty based on the message. Further, the apparatus may transmit notification data to a device operable by the second counterparty. The notification data includes product data characterizing the second product, and causes an application program executed at the device to present at least a portion of the product data within a digital interface. The apparatus also receives a response to the notification data from the device and, based on the response, provisions the second product to the second counterparty.

22 Claims, 7 Drawing Sheets

(56) References Cited

U.S. PATENT DOCUMENTS

| | | |
|---|---|---|
| 7,366,694 B2 | 4/2008 | Lazerson |
| 7,487,112 B2 | 2/2009 | Barnes, Jr. |
| 7,555,459 B2 | 6/2009 | Dhar et al. |
| 7,593,889 B2 | 9/2009 | Raines et al. |
| 7,624,070 B2 | 11/2009 | Lebouitz |
| 7,630,933 B2 | 12/2009 | Peterson et al. |
| 7,653,592 B1 | 1/2010 | Flaxman et al. |
| 7,676,425 B1 | 3/2010 | Noles |
| 7,676,431 B2 | 3/2010 | O'Leary et al. |
| 7,680,737 B2 | 3/2010 | Smith, Jr. et al. |
| 7,693,790 B2 | 4/2010 | Lawlor et al. |
| 7,707,055 B2 | 4/2010 | Behmoiras et al. |
| 7,707,107 B2 | 4/2010 | Gebb et al. |
| 7,801,778 B2 | 9/2010 | Fox |
| 7,809,633 B2 | 10/2010 | Nolan et al. |
| 7,813,965 B1 | 10/2010 | Robinson et al. |
| 7,827,052 B2 | 11/2010 | Scott et al. |
| 7,844,546 B2 | 11/2010 | Fleishman et al. |
| 7,849,003 B2 | 12/2010 | Egnatios et al. |
| 7,873,543 B2 | 1/2011 | Ferrier et al. |
| 7,899,712 B2 | 3/2011 | May et al. |
| 7,904,306 B2 | 3/2011 | Johnson et al. |
| 7,912,784 B2 | 3/2011 | Sobek |
| 7,970,669 B1 | 6/2011 | Santos |
| 8,156,022 B2 | 4/2012 | Fell et al. |
| 8,249,983 B2 | 8/2012 | Dilip et al. |
| 8,423,403 B2 | 4/2013 | McClung |
| 8,433,648 B2 | 4/2013 | Keithley et al. |
| 8,600,798 B1 | 12/2013 | Corr et al. |
| 8,606,705 B2 | 12/2013 | Zanzot et al. |
| 8,612,339 B2 | 12/2013 | Rose et al. |
| 8,615,426 B2 | 12/2013 | Carlson |
| 8,639,910 B2 | 1/2014 | Karamcheti et al. |
| 8,666,812 B1 | 3/2014 | Gandhi |
| 8,700,484 B2 | 4/2014 | Senior |
| 8,712,912 B2 | 4/2014 | Carlson et al. |
| 8,719,071 B2 | 5/2014 | MacIntyre et al. |
| 8,732,044 B2 | 5/2014 | Lovelett et al. |
| 8,744,899 B2 | 6/2014 | Rose et al. |
| 8,751,387 B2 | 6/2014 | Hougland et al. |
| 8,788,416 B1 | 7/2014 | Vu |
| 8,799,150 B2 | 8/2014 | Annappindi |
| 8,814,039 B2 | 8/2014 | Bishop et al. |
| 9,094,512 B2 | 7/2015 | Sheldon et al. |
| 9,218,618 B2 | 12/2015 | Walker et al. |
| 9,390,410 B2 | 7/2016 | Casares |
| 9,412,118 B2 | 8/2016 | Loomis |
| 9,563,915 B2 | 2/2017 | Brady et al. |
| 9,600,839 B2 | 3/2017 | Calman et al. |
| 9,792,600 B1 | 10/2017 | Grassadonia |
| 9,799,026 B1 | 10/2017 | Allen et al. |
| 9,875,385 B1 | 1/2018 | Humphreys et al. |
| 9,922,324 B2 | 3/2018 | Wilson et al. |
| 9,996,616 B2 | 6/2018 | Grant et al. |
| 10,108,959 B2 | 10/2018 | Wolfs et al. |
| 10,185,936 B2 | 1/2019 | Praisner et al. |
| 10,282,715 B2 | 5/2019 | Brennan et al. |
| 10,290,016 B1 | 5/2019 | Rose |
| 10,354,267 B2 | 7/2019 | Carlson et al. |
| 10,387,881 B2 | 8/2019 | Studnitzer |
| 10,453,062 B2 | 10/2019 | Wolfs et al. |
| 10,529,016 B2 | 1/2020 | Abela et al. |
| 10,535,054 B1 | 1/2020 | Spitzer |
| 10,552,807 B2 | 2/2020 | Marcous et al. |
| 10,558,962 B2 | 2/2020 | Szeto |
| 10,565,630 B2 | 2/2020 | Haceaturean et al. |
| 10,586,236 B2 | 3/2020 | Pourfallah et al. |
| 10,607,284 B2 | 3/2020 | Loganathan et al. |
| 10,643,277 B2 | 5/2020 | Berta et al. |
| 10,679,285 B1 | 6/2020 | Kurani et al. |
| 10,699,289 B1 | 6/2020 | Dalton et al. |
| 10,733,623 B2 | 8/2020 | Ovick et al. |
| 10,740,843 B2 | 8/2020 | Shakkarwar |
| 10,743,149 B2 | 8/2020 | Sewell |
| 10,771,413 B1 | 9/2020 | Heffron |
| 10,776,751 B2 | 9/2020 | Chin |
| 10,783,510 B2 | 9/2020 | George et al. |
| 10,789,580 B2 | 9/2020 | Wolfs et al. |
| 10,789,641 B2 | 9/2020 | Lesandro et al. |
| 10,909,508 B2 | 2/2021 | Fineman et al. |
| 11,468,443 B2 | 10/2022 | Jones et al. |
| 11,727,430 B2 | 8/2023 | Mitchell |
| 2002/0111915 A1 | 8/2002 | Clemens et al. |
| 2004/0138999 A1 | 7/2004 | Friedman et al. |
| 2004/0220873 A1 | 11/2004 | Nolan, III et al. |
| 2005/0004868 A1 | 1/2005 | Klatt et al. |
| 2006/0143124 A1 | 6/2006 | Ehrke |
| 2007/0198407 A1 | 8/2007 | Winter |
| 2007/0265946 A1 | 11/2007 | Schimpf et al. |
| 2007/0288312 A1 | 12/2007 | Wang |
| 2008/0270246 A1 | 10/2008 | Chen |
| 2009/0132410 A1 | 5/2009 | Penney et al. |
| 2009/0164627 A1 | 6/2009 | Bishop et al. |
| 2009/0271224 A1 | 10/2009 | Lange |
| 2010/0057606 A1 | 3/2010 | Louie |
| 2010/0057610 A1 | 3/2010 | Pinkerton |
| 2010/0211499 A1 | 8/2010 | Zanzot et al. |
| 2010/0250407 A1 | 9/2010 | Silva |
| 2011/0099067 A1 | 5/2011 | Cooper et al. |
| 2011/0191173 A1 | 8/2011 | Blackhurst |
| 2012/0036013 A1 | 2/2012 | Neuhaus |
| 2012/0284130 A1 | 11/2012 | Lewis et al. |
| 2013/0066800 A1 | 3/2013 | Falcone et al. |
| 2013/0073386 A1 | 3/2013 | Rose et al. |
| 2013/0073445 A1 | 3/2013 | Meszaros |
| 2013/0138563 A1 | 5/2013 | Gilder et al. |
| 2013/0226789 A1 | 8/2013 | Orttung et al. |
| 2013/0246220 A1 | 9/2013 | Hammad et al. |
| 2014/0025467 A1 | 1/2014 | Nagarahan et al. |
| 2014/0067677 A1 | 3/2014 | Ali et al. |
| 2014/0074688 A1 | 3/2014 | Shvarts |
| 2014/0095638 A1 | 4/2014 | Chen |
| 2014/0172687 A1 | 6/2014 | Chirehdast |
| 2014/0236695 A1 | 8/2014 | Shvarts et al. |
| 2014/0279444 A1 | 9/2014 | Kassemi et al. |
| 2014/0279513 A1 | 9/2014 | Dodds-Brown et al. |
| 2014/0310151 A1 | 10/2014 | Shishkov et al. |
| 2015/0032525 A1 | 1/2015 | Blackhurst et al. |
| 2015/0032538 A1 | 1/2015 | Calman et al. |
| 2015/0073902 A1 | 3/2015 | Soujanya |
| 2015/0100416 A1 | 4/2015 | Blackhurst et al. |
| 2015/0100481 A1 | 4/2015 | Ghosh et al. |
| 2015/0112854 A1 | 4/2015 | Guriel et al. |
| 2015/0170175 A1 | 6/2015 | Zhang et al. |
| 2015/0193873 A1 | 7/2015 | Hammock et al. |
| 2015/0228031 A1 | 8/2015 | Emison et al. |
| 2015/0310490 A1 | 10/2015 | Meredith et al. |
| 2015/0363762 A1 | 12/2015 | Kimberg |
| 2016/0034969 A1 | 2/2016 | Mazurov |
| 2016/0104155 A1 | 4/2016 | McGaugh et al. |
| 2016/0189292 A1 | 6/2016 | Deshpande et al. |
| 2016/0196566 A1 | 7/2016 | Murali et al. |
| 2016/0247177 A1* | 8/2016 | Zamer ............... G06Q 30/0206 |
| 2017/0004501 A1 | 1/2017 | Ledford et al. |
| 2017/0161826 A1 | 6/2017 | Packer et al. |
| 2017/0169511 A1 | 6/2017 | Kelly |
| 2017/0193501 A1 | 7/2017 | Cole et al. |
| 2017/0221066 A1 | 8/2017 | Ledford et al. |
| 2017/0270493 A1 | 9/2017 | Lugli et al. |
| 2017/0364878 A1 | 12/2017 | Malhotra et al. |
| 2018/0018661 A1 | 1/2018 | Wade |
| 2018/0096335 A1 | 4/2018 | Moghaizel et al. |
| 2018/0097901 A1 | 4/2018 | Ramachandra |
| 2018/0174116 A1 | 6/2018 | Maenpaa |
| 2018/0181928 A1* | 6/2018 | Woo ............... G06Q 20/223 |
| 2018/0330354 A1 | 11/2018 | Xiu et al. |
| 2019/0012645 A1 | 1/2019 | Subramaniam et al. |
| 2019/0043052 A1 | 2/2019 | Ledford et al. |
| 2019/0109915 A1 | 4/2019 | McPhee et al. |
| 2019/0114598 A1 | 4/2019 | Subramaniam et al. |
| 2019/0114666 A1 | 4/2019 | Kohli |
| 2019/0340590 A1 | 11/2019 | Ledford et al. |
| 2019/0378182 A1 | 12/2019 | Weinflash et al. |
| 2020/0014642 A1 | 1/2020 | Sidi et al. |

(56) References Cited

U.S. PATENT DOCUMENTS

| | | | |
|---|---|---|---|
| 2020/0034813 A1 | 1/2020 | Calinog et al. | |
| 2020/0051117 A1 | 2/2020 | Mitchell | |
| 2020/0074565 A1 | 3/2020 | Dotter | |
| 2020/0104911 A1 | 4/2020 | Suvajac et al. | |
| 2020/0160295 A1 | 5/2020 | Jagalpure et al. | |
| 2020/0242600 A1 | 7/2020 | Stack et al. | |
| 2020/0327529 A1 | 10/2020 | Mukherjee et al. | |
| 2020/0349639 A1 | 11/2020 | Mousseau | |
| 2020/0364760 A1 | 11/2020 | Sabat et al. | |
| 2020/0364784 A1 | 11/2020 | Dill | |
| 2020/0387878 A1 | 12/2020 | Jones et al. | |
| 2021/0150624 A1* | 5/2021 | Tucker | G06Q 20/405 |
| 2022/0044238 A1 | 2/2022 | Jones et al. | |
| 2022/0076248 A1 | 3/2022 | Kapoor et al. | |
| 2022/0198411 A1 | 6/2022 | Jones et al. | |
| 2022/0198417 A1 | 6/2022 | Jones et al. | |
| 2022/0198427 A1 | 6/2022 | Jones et al. | |
| 2022/0198432 A1 | 6/2022 | Jones et al. | |
| 2022/0198433 A1 | 6/2022 | Jones et al. | |
| 2022/0198445 A1 | 6/2022 | Jones et al. | |
| 2022/0198501 A1 | 6/2022 | Jones et al. | |
| 2022/0383301 A1 | 12/2022 | Jones et al. | |
| 2022/0383313 A1 | 12/2022 | Jones et al. | |
| 2022/0383314 A1 | 12/2022 | Jones et al. | |
| 2022/0414656 A1 | 12/2022 | Jones et al. | |
| 2023/0055605 A1 | 2/2023 | Jones et al. | |
| 2023/0056173 A1 | 2/2023 | Jones et al. | |
| 2023/0056764 A1 | 2/2023 | Jones et al. | |

FOREIGN PATENT DOCUMENTS

| | | |
|---|---|---|
| CN | 104321738 | 6/2018 |
| IN | 202011016562 | 6/2020 |
| KR | 20060003230 | 1/2006 |
| KR | 20170127418 | 11/2014 |
| KR | 2016014969 | 12/2016 |
| KR | 10-2073974 | 2/2020 |
| WO | WO 2001050370 | 7/2001 |
| WO | WO 2002069290 | 9/2002 |
| WO | WO 2003025712 | 3/2003 |
| WO | WO 2012151571 | 11/2012 |
| WO | WO 2013044286 | 4/2013 |
| WO | WO 2016190810 | 1/2016 |
| WO | WO 2019071263 | 4/2019 |

OTHER PUBLICATIONS

STIC Search Report, May 5, 2023 (4 pages).
Quibria, "Introduction to ISO 20022 For U.S. Financial Institutions", NACHA-3 The Electronic Payments Association; 45 pgs. (2015).
Wandhofer et al., "The Future of Correspondent Banking Cross Border Payments", Swift Institute Working Paper No. Jan. 2017; 63 pgs. (2018).
Rogers, The Definitive Guide to eCommerce Product Reviews (2017).
Khanna, "Venmo'ed: Sharing Your Payment Data with the World," Technology Science, 2018102901, Oct. 28, 2015 (27 pages).
STIC Search Report, Sep. 17, 2023 (4 pages).
Lochy, "Big Data in the Financial Services Industry—From data to insights", Finextra, 12 pgs. (2019).
Cohen, et al., "Ride on! Mobility business models for the sharing economy," Organization & Environment, 27.3, 2014, pp. 279-296.
Fis, Flavors of Fast, Report; 59 pages (2019).
Infosys, "Global Trends in the Cards and Payments Industry", 40 pgs. (2020).
Sullivan, "Sick of Overdraft Fees? There's an App for that." 8 pgs. (2018).
"POS Financing: There's A Lending Marketplace For That," PYMINTS. com; 19 pgs., (2020).
Target is Live with Afterpay.com; 4 pgs., (2021).
"Klama's Marketing Strategy: The Unique Growth Story Behind The Brand," 14 pgs. (2021).

* cited by examiner

REAL-TIME PROVISIONING OF TARGETED, ALTERNATIVE PRODUCT INFORMATION BASED ON STRUCTURED MESSAGING DATA

CROSS-REFERENCE TO RELATED APPLICATION

This application claims the benefit of priority to U.S. Provisional Patent Application No. 63/126,698, filed on Dec. 17, 2020, the entire disclosure of which is expressly incorporated herein by reference to its entirety.

TECHNICAL FIELD

The disclosed embodiments generally relate to computer-implemented systems and processes that provision, in real-time, targeted alternative product information based on structured messaging data.

BACKGROUND

Today, the mass adoption of smart phones and digital payments within the global marketplace drives an increasingly rapid adoption of real-time payment (RTP) technologies by financial institutions, consumers, vendors and merchants, and other participants in the payment ecosystem. Many RTP technologies emphasize data, messaging, and global interoperability, and in contrast to many payment rails, such as those that support credit card payments, embrace the near ubiquity of mobile technologies in daily life to provide participants in the RTP ecosystem real-time service and access to funds.

SUMMARY

In some examples, an apparatus includes a communications interface, a memory storing instructions, and at least one processor coupled to the communications interface and to the memory. The at least one processor is configured to execute the instructions to receive, via the communications interface, a message that includes elements of message data disposed within corresponding message fields. The message data characterizes a real-time payment requested by a first counterparty from a second counterparty, and the real-time payment is associated with a first product provisioned to the second counterparty by the first counterparty. The at least one processor is configured to execute the instructions to determine that a second product is available to the second counterparty based on one or more of the elements of the message data. The at least one processor is configured to execute the instructions to transmit, via the communications interface, first notification data to a device operable by the second counterparty. The first notification data includes product data characterizing the second product, and the first notification data causes an application program executed at the device to present at least a portion of the product data within a digital interface. The at least one processor is configured receive, via the communications interface, a response to the first notification data from the device, and based on the response, to perform operations that provision the second product to the second counterparty.

In other examples, a computer-implemented method includes receiving, using at least one processor, a message that includes elements of message data disposed within corresponding message fields. The message data characterizes a real-time payment requested by a first counterparty from a second counterparty, and the real-time payment is associated with a first product provisioned to the second counterparty by the first counterparty. The computer-implemented includes determining, using the at least one processor, that a second product is available to the second counterparty based on one or more of the elements of the message data. The computer-implemented method includes transmitting, using the at least one processor, first notification data to a device operable by the second counterparty. The first notification data includes product data characterizing the second product, and the first notification data causes an application program executed at the device to present at least a portion of the product data within a digital interface. The computer-implemented method includes receiving, using the at least one processor, a response to the first notification data from the device. Based on the response, the computer-implemented method includes performing operations, using the at least one processor, that provision the second product to the second counterparty.

Further, in some examples, a tangible, non-transitory computer-readable medium stores instructions that, when executed by at least one processor, cause the at least one processor to perform a method that includes receiving a message that includes elements of message data disposed within corresponding message fields. The message data characterizes a real-time payment requested by a first counterparty from a second counterparty, and the real-time payment is associated with a first product provisioned to the second counterparty by the first counterparty. The method includes determining that a second product is available to the second counterparty based on one or more of the elements of the message data, and transmitting notification data to a device operable by the second counterparty. The notification data includes product data characterizing the second product, and the notification data causes an application program executed at the device to present at least a portion of the product data within a digital interface. The method also includes receiving a response to the first notification data from the device, and based on the response, performing operations that provision the second product to the second counterparty.

It is to be understood that both the foregoing general description and the following detailed description are exemplary and explanatory only and are not restrictive of the invention, as claimed. Further, the accompanying drawings, which are incorporated in and constitute a part of this specification, illustrate aspects of the present disclosure and together with the description, serve to explain principles of the disclosed embodiments as set forth in the accompanying claims.

BRIEF DESCRIPTION OF THE DRAWINGS

Like reference numbers and designations in the various drawings indicate like elements.

DETAILED DESCRIPTION

Figure 1:
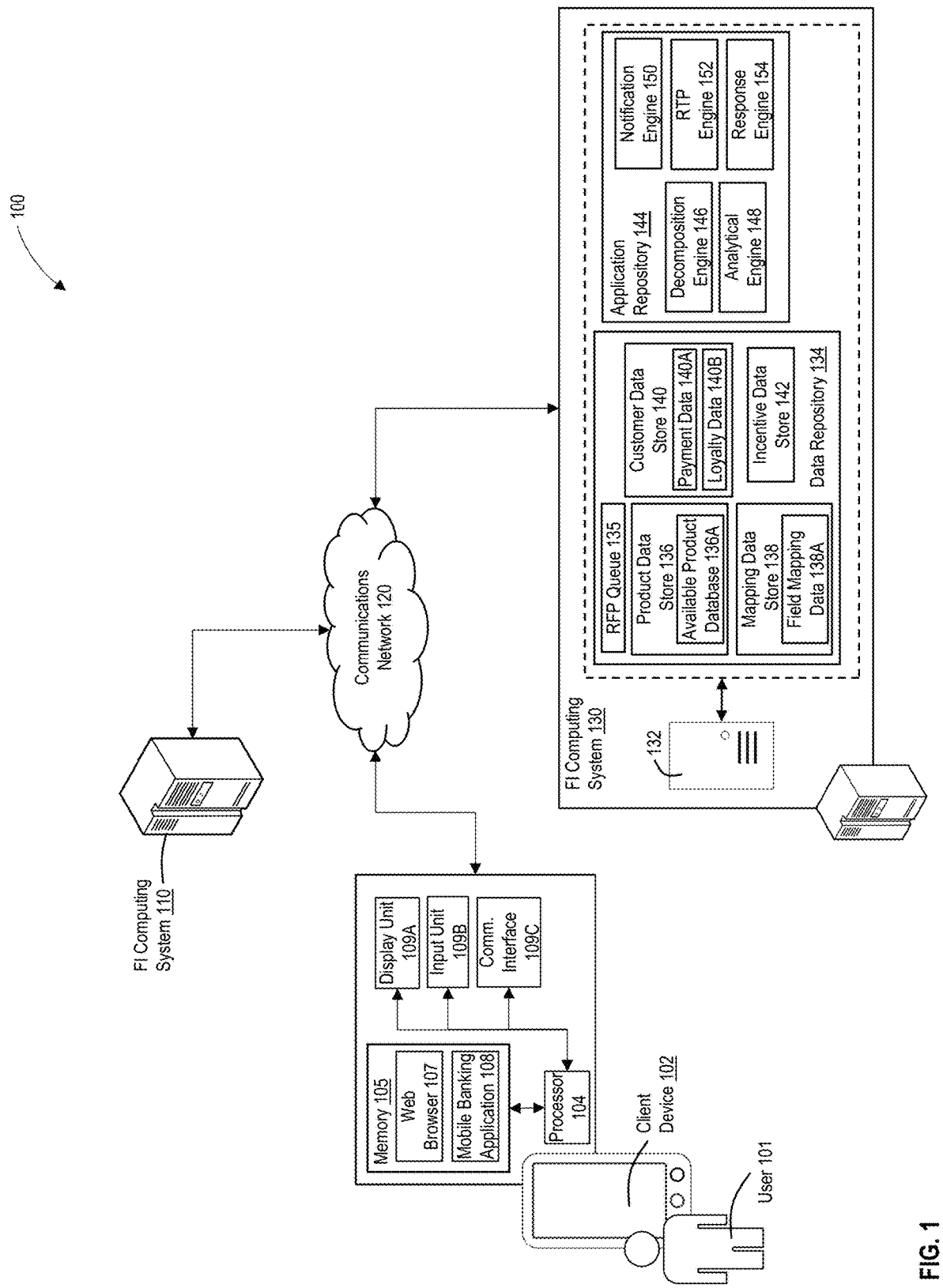
FIG. 1 is a block diagram of an exemplary computing environment, in accordance with some exemplary embodiments.

Today, the mass adoption of smart phones and digital payments within the global marketplace drives an adoption of real-time payment (RTP) technologies by financial institutions, consumers, vendors and merchants, and other participants in the payment ecosystem. These RTP technologies often emphasize data, messaging, and global interoperability and in contrast to conventional payment rails, may embrace the near ubiquity of mobile technologies in daily life to provide, to the participants in the RTP ecosystem, real-time service and access to funds. To facilitate the strong emphasis on data, messaging, and global interoperability between financial institutions, many RTP technologies adopt, and exchange data formatted in accordance with, one or more standardized data-exchange protocols, such as the ISO 20022 standard for electronic data exchange between financial institutions.

For example, a customer of a first financial institution may hold a loan product issued or serviced by a second financial institution that participates in the RTP ecosystem (e.g., a home mortgage, etc.), and to request a scheduled monthly payment on that loan product (e.g., portions of which are directed to an escrow account and directed to pay down respective portions of a principal amount and accrued interest, etc.), a computing system of the second financial institution may generate a Request for Payment (RFP) message, and transmit that message to one or more computing systems of a financial institution of the customer, e.g., directly or through one or more intermediate systems associated with the RTP ecosystem, such as a clearinghouse system. The generated and transmitted RFP message may, for example, be formatted in accordance with the ISO 20022 data-exchange format, and may include message fields populated with information that includes, but is not limited to, information identifying the customer and the second financial institution, information characterizing the requested payment, such as a total payment amount, a requested payment date or a payment due date, the portions of the requested payment that are directed to the escrow account, that are directed to pay down the principal amount, or that are directed to pay off accrued interest, and information identifying the loan product, such as, but not limited to, a type of loan product (e.g., a home mortgage, etc.), a term, a fixed interest rate, a variable interest rate (and a scheduled reset date or scheduled reset dates), the principal amount of the loan product, and/or a payoff amount associated with the loan product. Further, the ISO-20022-compliant RFP message may also include a link within a structured or unstructured message field to information, such as remittance data, associated with the requested monthly payment (e.g., a link to a PDF or HTML bill or payment stub that includes any of the information described herein that identifies the financial institution requesting payment, the requesting payment, or the loan product).

In some examples, the elements of structured or unstructured data maintained within the message fields of exemplary, ISO-20022-compliant RFP messages described herein may extend beyond the often-limited content of the message data transmitted across many payment rails and transaction processing networks. Further, when intercepted and processed by a computing system of the financial institution of the customer (e.g., an FI computing system), these elements of structured or unstructured RFP message data may be processed by the FI computing system to, determine one or more terms and conditions of an alternative loan product that is available to the customer and to provision, to a device of the customer in real-time and contemporaneously with the receipt of the RFP message, elements of digital content of that offer the alternative loan product to the customer as a replacement for the loan product issued by the second financial institution, either alone or in conjunction with one or more customer-specific incentives.

By way of example, and using any of the exemplary processes described herein, the FI computing system may provision an alternative product notification that identifies the determined terms and conditions of the alternative loan product and in some instances, the one or more customer-specific incentives, to an application program executed at the customer device. Upon presentation within a corresponding digital interface of the customer device by the executed application program, the alternative product notification may offer the alternative loan product to the customer as a replacement for the loan product issued by the second financial institution, and may prompts the customer to accept the offered alternative loan product, either alone or in conjunction with the one or more customer-specific incentives, in real-time and contemporaneously with the payment requested by the second financial institution. Further, and based on confirmation data indicative of the customer acceptance of the offered alternative loan product, the FI computing system may perform any of the exemplary processes described herein to issue the alternative loan product to the customer in accordance with the determined terms and conditions, and in some instances, to provision the one or more customer-specific incentives to the customers. The FI computing system may also perform any of the exemplary processes described herein to generate an additional, ISO-2002-compliant RTP message, when provisioned to one or more computing systems of the second financial institution, provides a payment for an outstanding balance of the loan product issued by the second financial institution using funds associated with the newly issued, alternatively loan, in real-time and contemporaneously with the payment requested by the second financial institution.

A. Exemplary Computing Environments

FIG. 1 is a diagram illustrating an exemplary computing environment 100 that includes, among other things, one or more computing devices, such as a client device 102, and one or more computing systems, such as financial institution (FI) computing systems 110 and 130, each of which may be operatively connected to, and interconnected across, one or more communications networks, such as communications network 120. Examples of communications network 120 include, but are not limited to, a wireless local area network (LAN), e.g., a "Wi-Fi" network, a network utilizing radio-frequency (RF) communication protocols, a Near Field Communication (NFC) network, a wireless Metropolitan Area Network (MAN) connecting multiple wireless LANs, and a wide area network (WAN), e.g., the Internet.

Client device 102 may include a computing device having one or more tangible, non-transitory memories, such as memory 105, that store data and/or software instructions, and one or more processors, e.g., processor 104, configured to execute the software instructions. The one or more tangible, non-transitory memories may, in some aspects, store software applications, application modules, and other elements of code executable by the one or more processors, such as, but not limited to, an executable web browser (e.g., web browser 107, such as Google Chrome™, Apple Safari™, etc.), and additionally or alternatively, an executable application associated with FI computing system 130 (e.g., mobile banking application 108). In some instances, not illustrated in FIG. 1, memory 105 may also include one or more structured or unstructured data repositories or databases, and client device 102 may maintain one or more elements of device data within the one or more structured or unstructured data repositories or databases. For example, the elements of device data may uniquely identify client device 102 within computing environment 100, and may include, but are not limited to, an Internet Protocol (IP) address assigned to client device 102 or a media access control (MAC) layer assigned to client device 102.

Client device 102 may also include a display unit 109A configured to present interface elements to a corresponding user, such as a user 101, and an input unit 109B configured to receive input from user 101, e.g., in response to the interface elements presented through display unit 109A. By way of example, display unit 109A may include, but is not limited to, an LCD display unit or other appropriate type of display unit, and input unit 109B may include, but is not limited to, a keypad, keyboard, touchscreen, voice activated control technologies, or appropriate type of input unit. Further, in additional aspects (not illustrated in FIG. 1), the functionalities of display unit 109A and input unit 109B may be combined into a single device, e.g., a pressure-sensitive touchscreen display unit that presents interface elements and receives input from user 101. Client device 102 may also include a communications interface 109C, such as a wireless transceiver device, coupled to processor 104 and configured by processor 104 to establish and maintain communications with communications network 120 via one or more communication protocols, such as WiFi®, Bluetooth®, NFC, a cellular communications protocol (e.g., LTE®, CDMA®, GSM®, 4G®, 5G®, etc.), or any other suitable communications protocol.

Examples of client device 102 may include, but are not limited to, a personal computer, a laptop computer, a tablet computer, a notebook computer, a hand-held computer, a personal digital assistant, a portable navigation device, a mobile phone, a smart phone, a wearable computing device (e.g., a smart watch, a wearable activity monitor, wearable smart jewelry, and glasses and other optical devices that include optical head-mounted displays (OHMDs)), an embedded computing device (e.g., in communication with a smart textile or electronic fabric), and any other type of computing device that may be configured to store data and software instructions, execute software instructions to perform operations, and/or display information on an interface device or unit, such as display unit 109A. In some instances, client device 102 may also establish communications with one or more additional computing systems or devices operating within environment 100 across a wired or wireless communications channel, e.g., via the communications interface 109C using any appropriate communications protocol. Further, user 101 may operate client device 102 and may do so to cause client device 102 to perform one or more exemplary processes described herein.

FI computing systems 110 and 130 may each represent a computing system that includes one or more servers and one or more tangible, non-transitory memory devices storing executable code, application engines, or application modules. Each of the one or more servers may include one or more processors, which may be configured to execute portions of the stored code, application engines, or application modules to perform operations consistent with the disclosed exemplary embodiments. For example, as illustrated in FIG. 1, the one or more servers of FI computing system 130 may include server 132 having one or more processors configured to execute portions of the stored code, application engines, or application modules maintained within the one or more corresponding, tangible, non-transitory memories. Further, each of FI computing systems 110 and 130 may also include one or more communication units, devices, or interfaces, such as one or more wireless transceivers, coupled to the one or more processors for accommodating wired or wireless internet communication across network 120 with other computing systems and devices operating within environment 100 (not illustrated in FIG. 1).

In some instances, FI computing system 110 and/or FI computing system 130 may correspond to a discrete computing system, although in other instances, FI computing system 110 or FI computing system 130 may correspond to a distributed computing system having multiple, computing components distributed across an appropriate computing network, such as communications network 120 of FIG. 1, or those established and maintained by one or more cloud-based providers, such as Microsoft Azure™, Amazon Web Services™, or another third-party, cloud-services provider. Further, in some instances, one or more of FI computing system 110 and FI computing system 130 may be incorporated into a single computing system, or may be incorporated into multiple computing systems.

By way of example, FI computing system 130 may be associated with, or operated by, a first financial institution that offers financial products or services to one or more customers, such as, but not limited to, user 101 that operates client device 102. The financial products or services may, for example, include payment instruments (e.g., accounts) maintained by the first financial institution for user 101, and available to fund payment transactions, such as RTP transactions. Examples of the payment instruments may include, but are not limited to, a credit card, checking, savings, or any other suitable deposit account. Further, the financial products or services may further include loans, such as line of credits, purchase loans, refinance loans, vehicle (e.g., car) loans, personal loans, or any other suitable loans to finance purchases or refinance existing loans. In some instances, FI computing system 130 may exchange data programmatically with one or more application programs executed at client device 102, such as mobile banking application 108, and based on the programmatically exchanged data, FI computing system 130 may perform any of the exemplary processes described herein to initiate a real-time payment, such as a real-time payment from an account of user 101 maintained at FI computing system 130 to FI computing system 110.

FI computing system 110 may be associated with, or operated by, a second financial institution, and may maintain one or more deposit accounts or loans with customers, such as, but not limited to, user 101. In some instances, FI computing system 110 may perform any of the exemplary processes described herein to initiate a request-for-payment (RFP) message for a loan maintained for a user, such as user 101, by the second financial institution, and FI computing system 110 may generate a message requesting a payment (e.g., minimum payment) for a loan product previously issued to and maintained for user 101. As described herein, the message may correspond to a Request for Payment (RFP) massage formatted and structured in accordance with one or more standardized data-exchange protocols, such as the ISO 20022 standard for electronic data exchange between financial institutions, and FI computing system 130 may perform operations that transmit the generated RFP message to FI computing system 130, either directly or through one or more clearinghouse system.

Further, FI computing system 130 may receive (e.g., intercept) the RFP message associated with the payment requested by the second financial institution from user 101, and FI computing system 130 may perform any of the exemplary processes described herein to obtain elements of structured or unstructured RFP message data from the message fields of the RFP message that identify and characterize, among other things, user 101, the requested payment, the second financial institution, and the loan product issued by that second financial institution (e.g., to "decompose" the RFP message). In some instances, and based on the obtained elements of obtain elements of structured or unstructured RFP message data, FI computing system 130 may perform any of the exemplary processes described herein to determine one or more terms and conditions of an alternative loan product that is available to the customer, and to provision, to a device of the customer in real-time and contemporaneously with the receipt of the RFP message, elements of digital content of that offer the alternative loan product to the customer as a replacement for the loan product issued by the second financial institution, either alone or in conjunction with one or more customer-specific incentives.

By way of example, and using any of the exemplary processes described herein, the FI computing system may provision an alternative product notification that identifies the determined terms and conditions of the alternative loan product and in some instances, the one or more customer-specific incentives, to an application program executed at the customer device. Upon presentation within a corresponding digital interface of the customer device by the executed application program, the alternative product notification may offer the alternative loan product to the customer as a replacement for the loan product issued by the second financial institution, and may prompts the customer to accept the offered alternative loan product, either alone or in conjunction with the one or more customer-specific incentives, in real-time and contemporaneously with the payment requested by the second financial institution. Further, and based on confirmation data indicative of the customer acceptance of the offered alternative loan product, the FI computing system may perform any of the exemplary processes described herein to issue the alternative loan product to the customer in accordance with the determined terms and conditions, and in some instances, to provision the one or more customer-specific incentives to the customers. The FI computing system may also perform any of the exemplary processes described herein to generate an additional, ISO-2002-compliant RTP message, when provisioned to one or more computing systems of the second financial institution, provides a payment for an outstanding balance of the loan product issued by the second financial institution using funds associated with the newly issued, alternatively loan, in real-time and contemporaneously with the payment requested by the second financial institution.

To facilitate a performance of one or more of these exemplary processes, FI computing system 130 may maintain, within the one or more tangible, non-transitory memories, a data repository 134 that includes, but is not limited to, a request-for-payment (RFP) message queue 135, a product data store 136, a mapping data store 138, a customer data store 140, and an incentive data store 142. RFP queue 135 may include one or more discrete RFP messages received by FI computing system 130 using any of the exemplary processes described herein. In some instances, the RFP messages maintained within RFP queue 135 may be prioritized in accordance with a time or date of receipt by FI computing system 130 or with requested payment data associated with each of the RFP messages, and each of the prioritized RFP messages may, in some examples, be associated with a corresponding temporal pendency. Further, FI computing system 130 may perform any of the exemplary processes described herein to provision elements of payment notification data associated with each of the prioritized RFP message to a computing system or device associated with a corresponding customer (e.g., client device 102 associated with user 101), and FI computing system 130 may perform operations that maintain each of the prioritized RFP messages within RFP queue 135 until a receipt, at FI computing system 130, of confirmation data from corresponding ones of the computing systems or devices indicating an approval, or a rejection, of the corresponding requested payment, or until an expiration of the corresponding pendency period.

Product data store 136 may include one or more structured or unstructured data records that establish a database 136A of available loan products, which may be offered to customers of the first financial institution, such as user 101. For example, each of the structured or unstructured data records of the established database 136A may include a loan product type (e.g., mortgage loan, refinance loan, personal loan, etc.) of a particular loan product, and terms and conditions of the loan product (e.g., APR, payment terms, maximum loan amount, etc.). In some instances, each of the structured or unstructured data records may further include customer qualification or underwriting process requirements, such as, but not limited to, a minimum income requirement, a minimum credit score requirement, a minimum loan to debt ratio requirement, a maximum total debt requirement, or any other appropriate include customer qualification or underwriting process requirement.

Mapping data store 138 may include structured or unstructured data records that maintain one or more elements of field mapping data 138A. For example, and as described herein, FI computing system 130 may receive, obtain, or intercept one or more RFP messages, each of which may be formatted and structured in accordance with a corresponding, standardized data-exchange protocol, such as the ISO 20022 standard for electronic data exchange between financial institutions. In some instances, the one or more elements of field mapping data 138A may characterize a structure, composition, or format of the message data populating one or more data fields of the ISO-20002-compliant RFP message, or a corresponding RFP message compliant with an additional, or alternate, standardized data-exchange protocol.

In some instances, customer data store 140 may include structured or unstructured data records that maintain information identifying and characterizing one or more customers of the financial institution, and further, interactions between these customers and not only the financial institution, but also other unrelated third parties, such as other financial institution (e.g., the second financial institution) described herein. For example, as illustrated in FIG. 1, customer data store 140 may include one or more elements of payment data 140A, which identify and characterize prior payment transactions involving the customers of the first financial institution (such as, but not limited to, user 101), and one or more elements of loyalty data 140B, which identify and characterize one or more loyalty programs offered by the first financial institution to its customers, and in which at least some of the customers of the first financial institution participate (e.g., one or more loyalty programs in which user 101 participates). As an example, loyalty data 140B may identify and characterize a particular program, and a number of "points" that each customer has accumulated. In some examples, a customer, such as user 101, may redeem their points for awards.

Incentive data store 142 may include structured or unstructured data records that include elements of digital content that, when presented to user 101 by client device 102 within a corresponding digital interface, identify and provide an incentive for user 101 to accept an alternate loan product offered by the first financial institution. By way of example, each structured or unstructured data record may identify and characterize one or more of a cash payment, a deferral period on payments associated with the alternative loan product, or disbursements of loyalty or rewards points. Further, in some instances, the structured or unstructured data records of incentive data store 142 may store each of the elements of digital content in conjunction with one or more elements of layout data, which specify a disposition of the elements of digital content, or visual characteristics of the elements of digital content, when rendered for presentation within a corresponding digital interface by one or more application programs executed by client device 102.

Further, and to facilitate the performance of any of the exemplary processes described herein, FI computing system 130 may also maintain, within the one or more tangible, non-transitory memories, an application repository 144 that maintains, but is not limited to, a decomposition engine 146, an analytical engine 148, a notification engine 150, a real-time payment (RTP) engine 152, and a response engine 154 each of which may be executed by the one or more processors of server 132. For example, and upon execution by the one or more processors of FI computing system 130, executed decomposition engine 146 may perform any of the exemplary processes described herein to obtain field mapping data 138A from mapping data store 138, to apply field mapping data 138A to a received, obtained, or intercepted RFP message, and based on the application of field mapping data 130A to the RFP message, to decompose the RFP message and obtain elements of message data that not only identify and characterize each counterparty involved in a request for payment (e.g., user 101 and the second financial institution, described herein), but that also characterize the requested payment. Further, and upon execution by the one or more processors of FI computing system 130, executed analytical engine 148 may perform any of the exemplary processes described herein to process the elements of message data obtained from the message fields of the RFP message, determine or infer an alternate loan product suitable for the counterparty from whom the payment is requested.

Executed, analytical engine 148 also may perform any of the exemplary processes described herein to identify one or more of the elements of digital content maintained within alternate product data store 136 that identify and characterize an alternate loan product to offer to a customer, such as user 101, and to generate one or more elements of an alternate product data that identifies the alternative loan product and one or more terms and conditions of the alternative loan product. Further, in some examples, executed analytical engine 148 may perform any of the exemplary processes described herein to identify (e.g., based on the records of incentive data store 142) one or more customer-specific incentives that are of potential relevance to the alternate loan product or to user 101, e.g., that would prompt user 101 to accept an offer of the alternative loan product when the corresponding terms and conditions are consistent with, or less favorable, than the terms and conditions associated with the loan product issued by the second financial institution.

Upon execution by the one or more processors of FI computing system 130, notification engine 150 may perform any of the exemplary processes described herein to generate one or more elements of an alternate product notification that, when provisioned to client device 102 by FI computing system 130, cause one or more application programs executed by client device 102 to present interface elements within a corresponding digital interface that prompt user 101 to accept, or define, the offered alternate loan product, either alone or in conjunction with the one or more customer-specific incentives. In some instances, executed notification engine 150 may perform any of the exemplary processes described herein to generate one or more elements of a payment notification that, when provisioned to client device 102 by FI computing system 130, cause one or more application programs executed by client device 102 to present interface elements within a corresponding digital interface that prompt user 101 to provide an approval of the real-time payment requested by the second financial institution via the RFP message.

Upon execution by the one or more processors of FI computing system 130, RTP engine 152 may perform any of the exemplary processes described herein to initiate a payment, such as a real-time payment, to one or more computing systems, such as to FI computing system 110 of the second financial institution. For example, and as described herein, executed RTP engine 152 may initiate a real-time payment for a loan product of user 101 maintained by the second financial institution. The real-time payment may, for example, be associated with a payment amount that satisfies (e.g., "pays off") an outstanding balance of the loan product issued to user 101 by the second financial institution, and executed RTP engine 152 may generates a corresponding real-time payment message in accordance with one or more standardized data-exchange protocols, such as the ISO 20022 standard.

Upon execution by the one or more processors of FI computing system 130, response engine 154 may perform any of the exemplary processes described herein to process a received response from, for example, client device 102. For example, as described herein, client device 102 may generate and transmit a response to FI computing system 130 that includes confirmation data identifying whether user 101 accepted, or declined, an offer for an alternate loan product. Executed response engine 154 may perform operations to parse and extract the confirmation data from the received response, and may, in some examples, store the extracted confirmation data within one or more structured or unstructured data repositories or databases.

B. Computer-Implemented Processes for Provisioning Targeted, Alternate Product

Figure 2A:
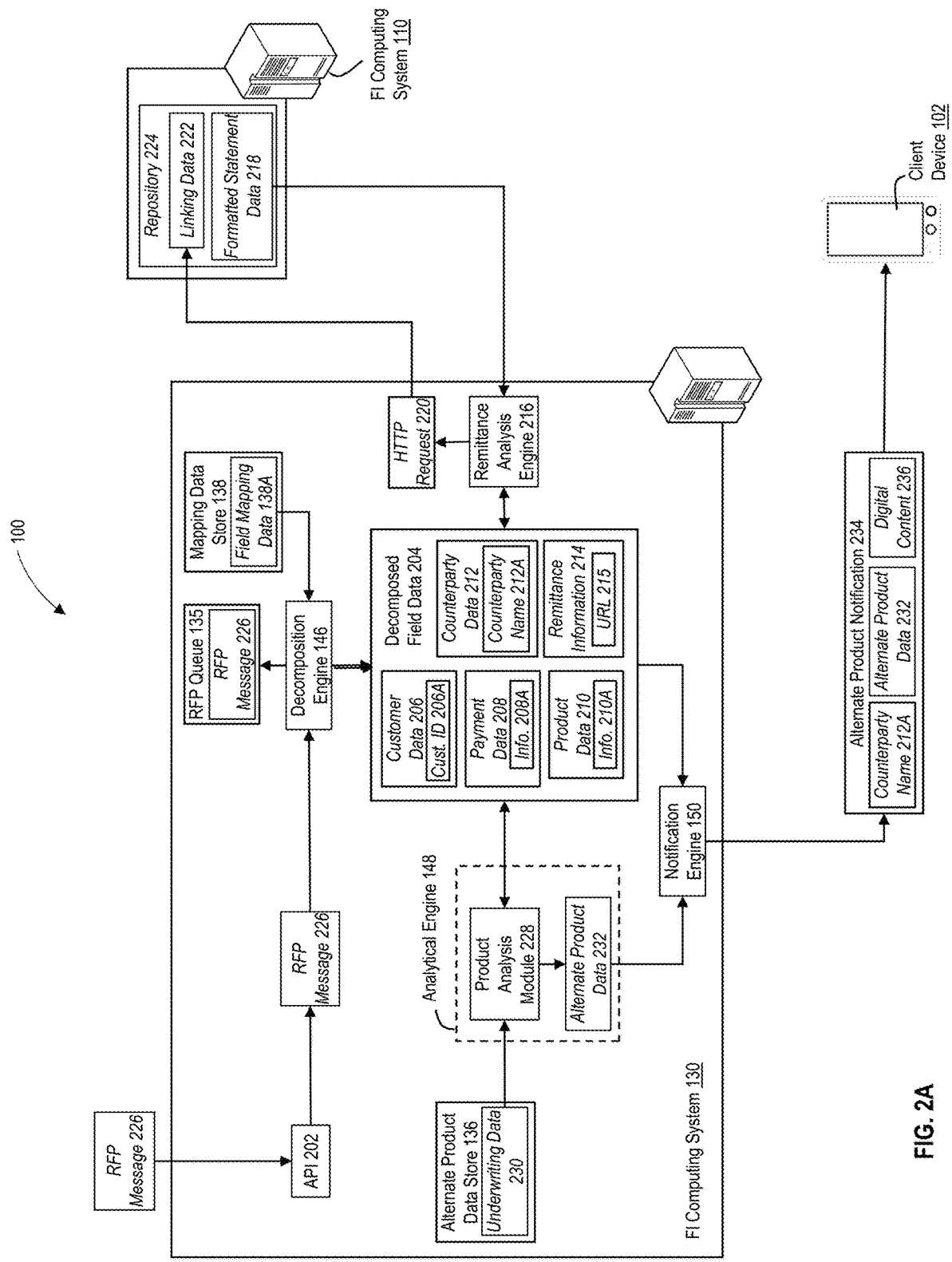
FIGS. 2A, 2B, 2C, 3A, and 3B are block diagrams illustrating portions of an exemplary computing environment, in accordance with some exemplary embodiments.

Information in Real-Time based on Structured Messaging Data Referring to FIG. 2A, a computing system associated with the first financial institution, such as FI computing system 130, may receive or intercept an RFP message generated by a computing system associated with the second financial institution, such as FI computing system 110. RFP message 226 may be structured and formatted in accordance with the one or more elements of field mapping data 138A and that requests a payment from user 101 for a loan issued to user 101 by the second financial institution and maintained by FI computing system 110. By way of example, RFP message 226 may be structured in accordance with the ISO 20022 standard for electronic data exchange between financial institutions, and in some examples, RFP message 226 may correspond to a pain.013 message as specified within the ISO 20022 standard. Further, and as described herein, the one or more elements of field mapping data 138A may characterize a structure, composition, or format of one or more data fields of ISO-20002-compliant RFP message 226 (e.g., the one or more data fields within a pain.013 message).

As described herein, the ISO-20022-compliant RFP message 226 may be associated with a monthly payment, requested by the second financial institution, for a loan product issued by user 101 by the second financial institution. By way of example, ISO-20022-compliant RFP message 226 may include among other things: (i) message fields populated with data identifying the customer (e.g., user 101) and the financial institution requesting payment from user 101 (e.g., the second financial institution); (ii) message fields populated with data characterizing the requested payment, such as a total payment amount, a requested payment date or a payment due date, the portions of the requested payment that are directed to the escrow account, that are directed to pay down the principal amount, or that are directed to pay off accrued interest; (iii) message fields populated with data identifying the loan product, such as, but not limited to, a type of loan product (e.g., a home mortgage, an auto loan, etc.), a term, a fixed interest rate, a variable interest rate (and a scheduled reset date or scheduled reset dates), the principal amount of the loan product, and/or a payoff amount associated with the loan product; and (iv) a link within a structured or unstructured message field to information, such as remittance data, associated with the requested monthly payment (e.g., a link to a PDF or HTML statement or payment stub that includes any of the information described herein that identifies the financial institution requesting payment, the requesting payment, or the loan product).

A programmatic interface established and maintained by FI computing system 130, such as application programming interface (API) 202, may receive RFP message 226 directly from FI computing system 110 of the second financial institution, or through one or more intermediate computing systems (e.g., one or more clearinghouse systems), and may route RFP message 226 to a decomposition engine 146 executed by the one or more processors of FI computing system 130. In some examples, FI computing system 130 may receive RFP message 226 directly across network 120 via a channel of communications established programmatically between API 202 and an executed RFP engine of FI computing system 110. Further, in some examples, one or more portions of RFP message 226 may be encrypted (e.g., using a public cryptographic key associated with FI computing system 130), and executed decomposition engine 146 may perform operations that access a corresponding decryption key maintaining within the one or more tangible, non-transitory memories of FI computing system 130 (e.g., a private cryptographic key associated with FI computing system 130), and that decrypt the encrypted portions of RFP message 226 using the corresponding decryption key.

In some instances, executed decomposition engine 146 may store RFP message 226 (in decrypted form) within a corresponding portion of data repository 134, e.g., within RFP queue 135. Executed decomposition engine 146 may also perform operations that access mapping data store 138 (e.g., as maintained within data repository 134), and obtain one or more elements of fields mapping data 138A that characterize a structure, composition, or format of one or more data fields of RFP message 226. For example, and as described herein, RFP message 226 may include message fields consistent with the ISO 20022 standard for electronic data exchange between financial institutions, and each of the message fields may be populated with data structured and formatted in accordance with the ISO 20022 standard.

Based on the obtained elements of field mapping data 138A, executed decomposition engine 146 may perform operations that parse RFP message 226 and obtain elements of decomposed field data 204 that identify and characterize user 101, the second financial institution, a loan product, and a requested payment to be made towards the loan product. In some instances, and through the performance of these exemplary operations, executed decomposition engine 146 may "decompose" the structured or unstructured data populating the message fields of RFP message 226 in accordance with field mapping data 138A, and generate the elements of decomposed field data 204 that include, but are not limited to, one or more elements of customer data 206, payment data 208, product data 210, and counterparty data 212.

By way of example, and based on the elements of field mapping data 138A, executed decomposition engine 146 may determine that RFP message 226 includes data within message fields that identify and characterize user 101, and may perform operations that obtain, from the corresponding message fields of RFP message 226, a name of user 101 (e.g., "John Q. Stone") and a postal address of user 101 (e.g., "3405 Dumbarton Street NW, Washington, D.C., 20007, U.S."). Executed decomposition engine 146 may perform additional operations that package the obtained customer name and the postal address into corresponding portions of customer data 206. Further, and based on the elements of field mapping data 138A, executed decomposition engine 146 may perform operations that identify one or more additional message fields of RFP message 226 includes data within message fields identifying and characterizing the second financial institution, and that obtain, from the additional message fields of RFP message 226, one or more identifiers of the financial institution, such as, but not limited to, a name of the second financial institution or a bank routing number associated with the financial institution. Executed decomposition engine 146 may perform additional operations that package the one or more identifiers of the second financial institution (e.g., the name, the bank routing number, etc.) into corresponding portions of counterparty data 212.

Additionally, and based on the elements of field mapping data 138A, executed decomposition engine 146 may identify one or more further message fields of RFP message 226 include elements of data identifying and characterizing the requested payment, such as, but not limited to, a payment amount of the requested payment (e.g., $2,000), an identifier of an account associated with the second financial institution and available of receiving the requested payment (e.g., a tokenized account number "XXXXXXXXX1234," etc.), and a requested payment date (e.g., "Jan. 15, 2022"), and executed decomposition engine 146 may perform operations that extract the payment amount, the account identifier, and the requested payment date from the further message fields, and that package the extracted payment amount, account identifier, and he requested payment date into corresponding portions of payment data 208. The disclosed embodiments are, however, not limited RFP messages that include these exemplary elements of payment data. For example, and based on the elements of field mapping data 138A, executed decomposition engine 146 may determine that the message fields of RFP message 226 includes additional data that identifies those portions of the payment amount allocated to an escrow account (e.g., $500), to pay down the principal amount of the loan product (e.g., $1,300), and to pay down accrued interest (e.g., $200), and executed decomposition engine 146 may perform additional operations that extract data characterizing the portions of the payment amount allocated to the escrow account, the principal amount and accrued interest and that package the extracted data into additional portions of payment data 208.

Further, and based on the elements of field mapping data 138A, executed decomposition engine 146 may determine that additional, or alternate, message fields of RFP message 226 includes elements of data that identify and characterize the loan product issued by the second financial institution, such as, but not limited to, a type of loan product (e.g., a thirty-year, fixed-rate home mortgage), an interest rate of the loan product (e.g., 4.2% APR), the principal amount of the loan product (e.g., $270,000), and a current payoff amount associated with the loan product (e.g., $200,000). Executed decomposition engine 146 may perform additional operations that extract the elements of data that identify and characterize the loan product from the additional, or alternate, message fields of RFP message 226, and that package the extracted data elements into corresponding portions of product data 210. In some instances, and based on the elements of field mapping data 138A, executed decomposition engine 146 may also determine that additional message fields of RFP message 226 includes elements of counterparty data that identify and characterize the second financial institution, e.g., that issued the loan product to user 101 and that requested the $2,000 monthly payment. By way of example, executed decomposition engine 146 may extract, from the additional message fields of RFP message 226, elements of counterparty data 212 that include, but are not limited to, a name 212A of the second financial institution (e.g., "Bank Barry"), a postal address associated with the second financial institution, or an additional, or alternate, identifier of the second financial institution, such as a SWIFT code. Executed decomposition engine 146 may package the extracted elements of counterparty data 212, include name 212A, into a corresponding portion of decomposed field data 204.

Further, executed decomposition engine 146 may also determine, based on the elements of field mapping data 138A, that a message field of RFP message 226 includes structured or unstructured elements of remittance data that characterizes further the requested monthly payment, user 101, or the second financial institution, and executed decomposition engine 146 may obtain the structured or unstructured elements of remittance data from RFP message 226 and package the obtained elements of remittance data into corresponding portions of remittance information 214. For example, the elements of structured or unstructured remittance data may include a link (e.g., a short-form or tiny URL, a long-form URL, etc.) to formatted statement data associated with the requested monthly payment and maintained by FI computing system 110, and executed decomposition engine 146 may obtain the short- or long-form link from message fields of RFP message 226, and package the short- or long-form link into remittance information 214, e.g., as URL 215.

In some instances, the one or more processors of FI computing system 130 may execute a remittance analysis engine 216, which may perform operations that, based on URL 215 maintained within remittance information 214 of decomposed field data 204, programmatically access elements of formatted statement data 218 maintained at FI computing system 110 of the second financial institution, and that process the accessed elements of formatted statement data 218 to obtain additional, or alternate, elements of customer data 206, payment data 208, product data 210, or counterparty data 212. For example, remittance analysis engine 216 may access URL 215 maintained within remittance information 214 (e.g., the short- or long-form URL described herein, etc.), and may process URL 215 and generate a corresponding HTTP request 220 for the elements of formatted statement data 218 maintained at FI computing system 110. Executed remittance analysis engine 216 may also perform operations that cause FI computing system 130 to transmit HTTP request 220 across network 120 to FI computing system 110.

FI computing system 110 may, for example, receive HTTP request 220, and based on portions of HTTP request 220 and linking data 222 (e.g., based on a determined match or correspondence between the portions of HTTP request 220 and linking data 222), FI computing system 110 may perform operations that obtain the elements of formatted statement data 218 from data repository 224, and that transmit the elements of formatted statement data 218 across network 120 to FI computing system 130, e.g., as a response to HTTP request 220. Further, as illustrated in FIG. 2A, executed remittance analysis engine 216 may receive the elements of formatted statement data 218 from FI computing system 110, and may perform any of the exemplary processes described herein to parse the elements of formatted statement data 218 (e.g., in a received format, such as a PDF or HTML form, or in a transformed or enhanced format, etc.) and obtain, from the parsed elements of formatted statement data 218, one or more of the additional, or alternate, elements of customer data 206, payment data 208, product data 210, or counterparty data 212. By way of example, executed remittance analysis engine 216 may apply one or more optical character recognition (OCR) processes or optical word recognition (OWR) processes to the elements of formatted statement data 218 in PDF form to generate, or obtain, elements of textual content representative of the data that characterize user 101, the second financial institution, the loan product issued by the second financial institution, or the requested payment.

By way of example, executed remittance analysis engine 216 may perform operations that detect a presence one or more keywords within the generated elements of textual content (e.g., "monthly payment," "principal," "interest rate," etc.), and may extract elements of the textual content associated with these keywords as corresponding ones of the additional, or alternate, elements of customer data 206, payment data 208, product data 210, or counterparty data 212. In other examples, executed remittance analysis engine 216 may detect a presence of the additional, or alternate, elements of customer data 206, payment data 208, product data 210, or counterparty data 212 within the generated textual content based on an application of one or more adaptively trained machine learning or artificial intelligence models to portions of the textual content, and examples of these adaptively trained machine learning or artificial intelligence models includes a trained neural network process (e.g., a convolutional neural network, etc.) or a decision-tree process that ingests input datasets composed of all, or selected portions, of the textual content. The disclosed embodiments are, however, not limited to exemplary processes for detecting and extracting one or more of the additional, or alternate, elements of customer data 206, payment data 208, product data 210, or counterparty data 212 from the generated textual content, and in other instances, executed remittance analysis engine 216 may perform any additional, or alternate, process for identifying one or more of the additional, or alternate, elements of customer data 206, payment data 208, product data 210, or counterparty data 212 within the textual content derived from the processing of the elements of formatted statement data 218 in PDF format.

Further, and as described herein, the elements of formatted statement data 218 may be structured in HTML form, and may include metadata that identify and characterize user 101 (e.g., the customer name, etc.), the second financial institution (e.g., the name or other identifier, etc.), the requested payment (e.g., a payment amount, etc.), or the loan product issued by the second financial institution (e.g., an interest rate, an amount of remaining principal, etc.). Executed remittance analysis engine 216 may perform operations that detect one or more of the elements of metadata within the elements of formatted statement data 218, and that obtain, from the elements of metadata, additional, or alternate, elements of customer data 206, payment data 208, product data 210, or counterparty data 212, as described herein. The disclosed embodiments are, however, not limited to these exemplary processes for detecting and extracting the additional, or alternate, elements of customer data 206, payment data 208, product data 210, or counterparty data 212 from HTML-formatted receipt data, and in other instances, executed remittance analysis engine 216 may perform any additional, or alternate, process detecting and obtaining data from the elements of formatted statement data 218 structured in HTML form, including, but not limited to, an application of one or more screen-scraping processes to portions of formatted statement data 218 structured in HTML form.

In some instances, executed decomposition engine 146 may perform operations that store decomposed field data 204, which includes the element of customer data 206, payment data 208, product data 210, counterparty data 212, and remittance information 214, within a corresponding portion of data repository 134 (not illustrated in FIG. 2), and may provide decomposed field data 204 as an input to analytical engine 148 of FI computing system 130. Upon execution by the one or more processors of FI computing system 130, executed analytical engine 148 may perform any of the exemplary processes described herein to determine one or more terms and conditions of an alternate financial product, such as an alternative loan product, available for provisioning to user 101 based on at least a portion of the elements of customer data 206, payment data 208, product data 210, counterparty data 212, and remittance information 214.

By way of example, a product analysis module 228 of executed analytical engine 148 may perform operations that access counterparty data 212 within decomposed field data 204 and obtain name 212A of the second financial institution (e.g., "Bank Barry"), and that access payment data 208 within decomposed field data 204 and obtain the $2,000 payment amount of the requested payment. Executed product analysis module 228 of analytical engine 148 may perform operations that access product data 210 within decomposed field data 204 and obtain, among other things, the type of loan product (e.g., the thirty-year, fixed-rate home mortgage), the interest rate of the loan product (e.g., the 4.2% APR), the principal amount of the loan product (e.g., $270,000), and the current payoff amount associated with the loan product (e.g., $200,000). Further, executed product analysis module 228 may also obtain, e.g., from product data store 136 of data repository 134, elements of underwriting data 230 identifying and characterizing one or more internal qualification or underwriting processes associated with loan products issued by the first financial institution (not illustrated in FIG. 2A).

In some instances, and based on an application of the one or more internal qualification or underwriting processes specified within underwriting data 230 to the elements of customer data 206, to additional elements of data that characterize user 101's interaction with the first financial institution (e.g., associated with FI computing system 130) and the second financial institution (e.g., associated with FI computing system 110), and additionally, or alternatively, to elements of data that characterize a current valuation of user 101's home, executed product analysis module 228 may perform operations that identify an alternate loan product available to user 101 and capable of funding the current payoff amount associated with the loan product (and any fees), and that determine one or more terms and conditions of that alternate loan product, such as, but not limited to, an interest rate, a term, a monthly payment amount, or a maximum loan amount. The additional elements of data that characterize user 101's interaction with the first and second financial institutions may include, but are not limited to, elements of credit-bureau data associated with user 101 and maintained by a computing system of a reporting entity (e.g., a credit score of user 101, a number of credit inquiries associated with user 101, etc.) and elements of account or transaction data maintained by FI computing system 130, which identify one or more financial products issued by the first financial institution and held by user 101, a time-evolving status of these financial products (e.g., account balances, etc.), and one or more transactions involving these financial products.

Executed product analysis module 228 may also perform any of the exemplary processes described herein to generate elements of alternate product data 232 associated with the alternate loan product, and store the elements of alternate product data 232 within a portion of a locally or remotely accessible data repository, such as within data repository 134 (not illustrated in FIG. 2A). For example, alternate product data 232 may identify and characterize one or more of the determined terms and conditions of the alternate loan product, such as, but not limited to, the corresponding interest rate, term, monthly payment amount, and/or a maximum loan amount. Further, and based on portions of payment data 208, product data 210, and the elements of alternate product data 232, executed product analysis module 228 may perform operations that determine whether the determined terms and conditions of the alternate loan product render than alternative loan product a more favorable, a comparable, or a less favorable alternative to the loan product issued by the second financial institution and associated with the real-time payment requested by RFP message 226.

By way of example, the alternative loan product may include a comparable, fixed-rate home mortgage associated with terms and conditions that include, but are not limited to, with a 3.8% annual percentage rate and a monthly payment of $1,950. In some instances, executed product analysis module 228 may determine that the 4.2% annual percentage rate associated with the loan product issued by the second financial institution exceeds the 3.8% annual percentage rate associated with the alternate loan product available to user 101, and that the $2,000 requested monthly payment for the loan product issued by the second financial institution exceeds the $1,950. Based on the determination that the annual percentage rate and monthly payment of the loan product issued by the second financial institution exceed, respectively, the annual percentage rate and monthly payment of the alternative loan product available at the first financial institution, executed product analysis module 228 may establish that the alternatively loan product represents a more favorable alternative to the loan product issued by the second financial institution, and may provide alternate product data 232 as an input to notification engine 150, which, upon execution by the one or more processors of FI computing system 130, may perform any of the exemplary processes described herein to generate one or more elements of an alternate product notification 234 associated with the alternate loan product available for issuance to user 101 by the first financial institution.

For example, executed notification engine 150 may receive alternate product data 232, which may include terms and conditions of an alternate loan product, such as data identifying an interest rate and a monthly payment amount. Further, executed notification engine 150 may also perform operations that access data repository 134, and obtain decomposed field data 204 that includes one or more elements of customer data 206, payment data 208, product data 210, counterparty data 212, and remittance information 214 extracted from the structured or unstructured message fields of RFP message 226 and as such, that characterize the requested payment from user 101 by the second financial institution. In some instances, executed notification engine 150 may parse customer data 206 within decomposed field data 204 to obtain a customer identifier 206A of user 101, such as, but not limited, a full name of user 101 extracted from message fields of the RFP message 226 (e.g., "John Q. Stone"). Further, executed notification engine 150 may also perform operations that parse payment data 208 to obtain payment information 208A that identifies the $2,000 requested payment, and, in some examples, the requested payment date. Further, executed notification engine 150 may parse product data 210 within decomposed field data 204 to obtain product information 210A that identifies one or more of the interest rate of the loan product (e.g., 4.2% APR), the principal amount of the loan product (e.g., $270,000), and a current payoff amount associated with the loan product (e.g., $200,000).

Figure 2B:
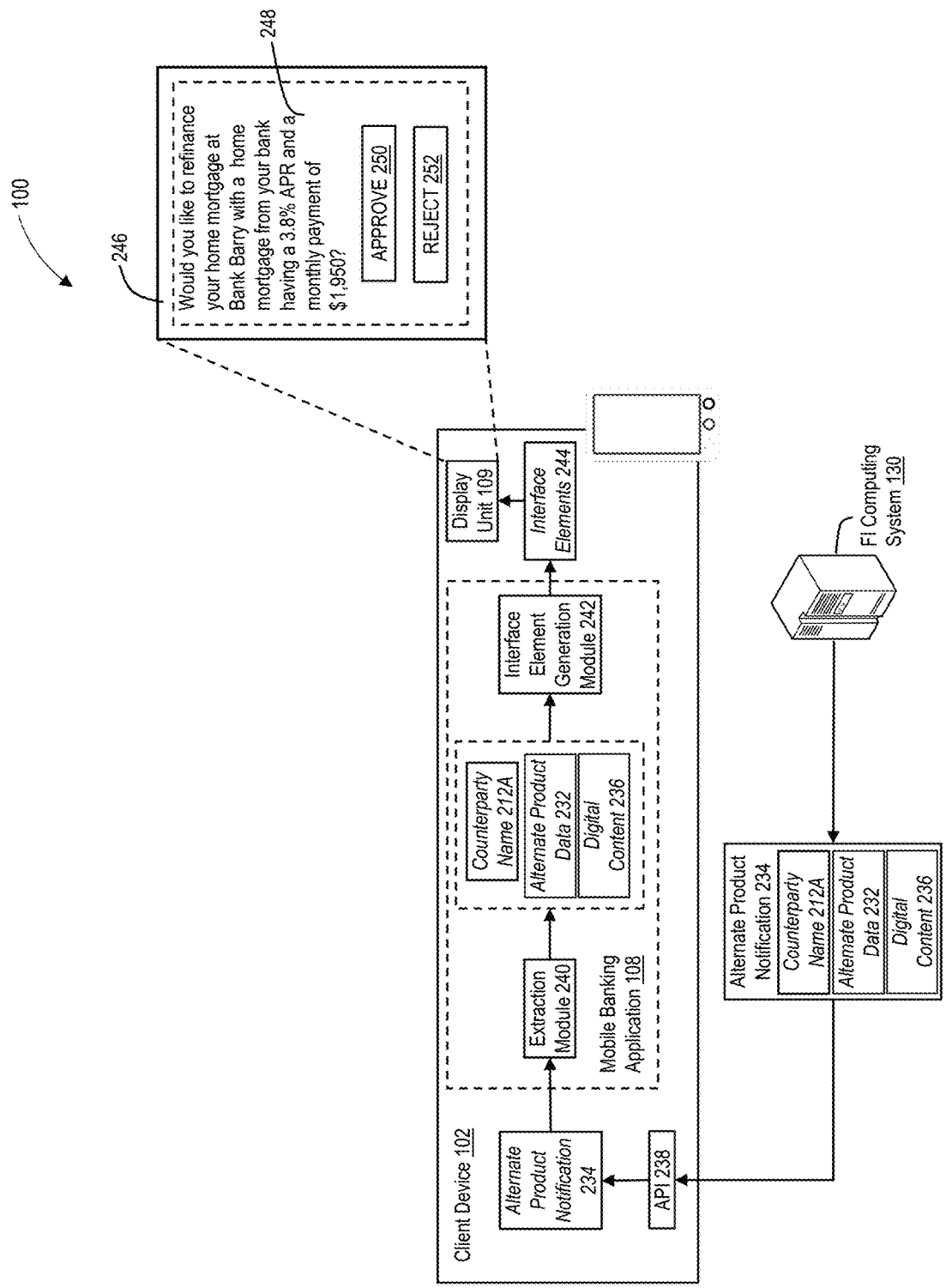

Based on the one or more elements of customer data 206, payment data 208, product data 210, and counterparty data 212 maintained within decomposed field data 204, and based on the elements of alternate product data 232, executed notification engine 150 may generate an alternate product notification 234 that includes portions of alternate product data 232, which identify and characterize the alternate loan product, and elements of digital content 236 that, when rendered for presentation by one or more application programs executed by client device 102 within a corresponding digital interface, prompts user 101 to accept, or decline, an offer to refinance the loan product issued by the second financial institution using the alternate loan product available for issuance by the first financial institution. By way of example, executed notification engine 150 may package, into corresponding portions of alternate product notification 234, name 212A of the second financial institution (e.g., "Bank Barry"), portions of alternate product data 232 that identify the annual percentage rate (e.g., the 3.8% APR) and the monthly payment (e.g., $1,950) associated with the alternate loan product, along with the identifier of the second financial institution (e.g., the name "Bank Barry"), the loan type of the loan product (e.g., the thirty-year home mortgage). As illustrated in FIG. 2B, executed notification engine 150 may perform operations that cause FI computing system 130 to transmit alternate product notification 234 across network 120 to client device 102.

Referring to FIG. 2B, a programmatic interface associated with one or more application programs executed at client device 102, such as an application programming interface (API) 238 associated with mobile banking application 108, may receive alternate product notification 234 and may perform operations that cause client device 102 to execute mobile banking application 108 (e.g., through a generation of a programmatic command, etc.). Upon execution by the one or more processors of client device 102, executed mobile banking application 108 may receive alternate product notification 234 from API 238, and an extraction module 240 of executed mobile banking application 108 may parse alternate product notification 234 and obtain name 212A of the second financial institution, alternate product data 232, and digital content 236. Further, executed extraction module 240 may also provide name 212A, alternate product data 232, and digital content 236 to an interface element generation module 242 of executed mobile banking application 108, which may perform operations that generate interface elements 244 based on portions of name 212A, alternate product data 232, and digital content 236, and that route interface elements 244 to display unit 109A.

In some instances, when rendered for presentation within a corresponding notification interface 246 by display unit 109A, interface elements 244 provide a graphical representation 248 of an offer for the alternate loan product associated with the APR of 3.8% and the $1,950 monthly payment within a single display screen or window, or across multiple display screens or windows, of notification interface 246. For example, interface elements 244 may, when presented within notification interface 246, provide a graphical representation of the alternate loan product and prompt user 101 to approve or reject the alternate loan product, e.g., based on additional input provided to input device 109B of client device 102 that selects a respective one of an "APPROVE" icon 250 and a "REJECT" icon 252 presented within notification interface 246. For example, user 101 may elect to accept the offered, alternate loan product by providing input (e.g., via input unit 109B) to select the "APPROVE" icon 250, or may decline the offered, alternate loan product by providing input to select the "REJECT" icon 252.

In other examples, and based on portions of payment data 208, product data 210, and the elements of alternate product data 232, executed product analysis module 228 may perform operations that determine that the terms and conditions of the alternate loan product render than alternative loan product a comparable, or a less favorable alternative, to the loan product issued by the second financial institution and associated with the real-time payment requested by RFP message 226. For instance, executed product analysis module 228 may determine that a 3.8% annual percentage rate and a monthly payment of $1,950 were consistent with the corresponding annual percentage rate and monthly payment of the loan product issued by the second financial institution. In other instances, executed product analysis module 228 may determine that the 3.8% annual percentage rate of the alternative loan product exceeds a corresponding annual percentage rate of the loan product issued by the second financial institution, and additionally, or alternatively, that the $1,950 monthly payment for the alternative loan product exceeds the corresponding monthly payment for the loan product issued by the second financial institution (e.g., the payment requested by RFP message 226).

Figure 2C:
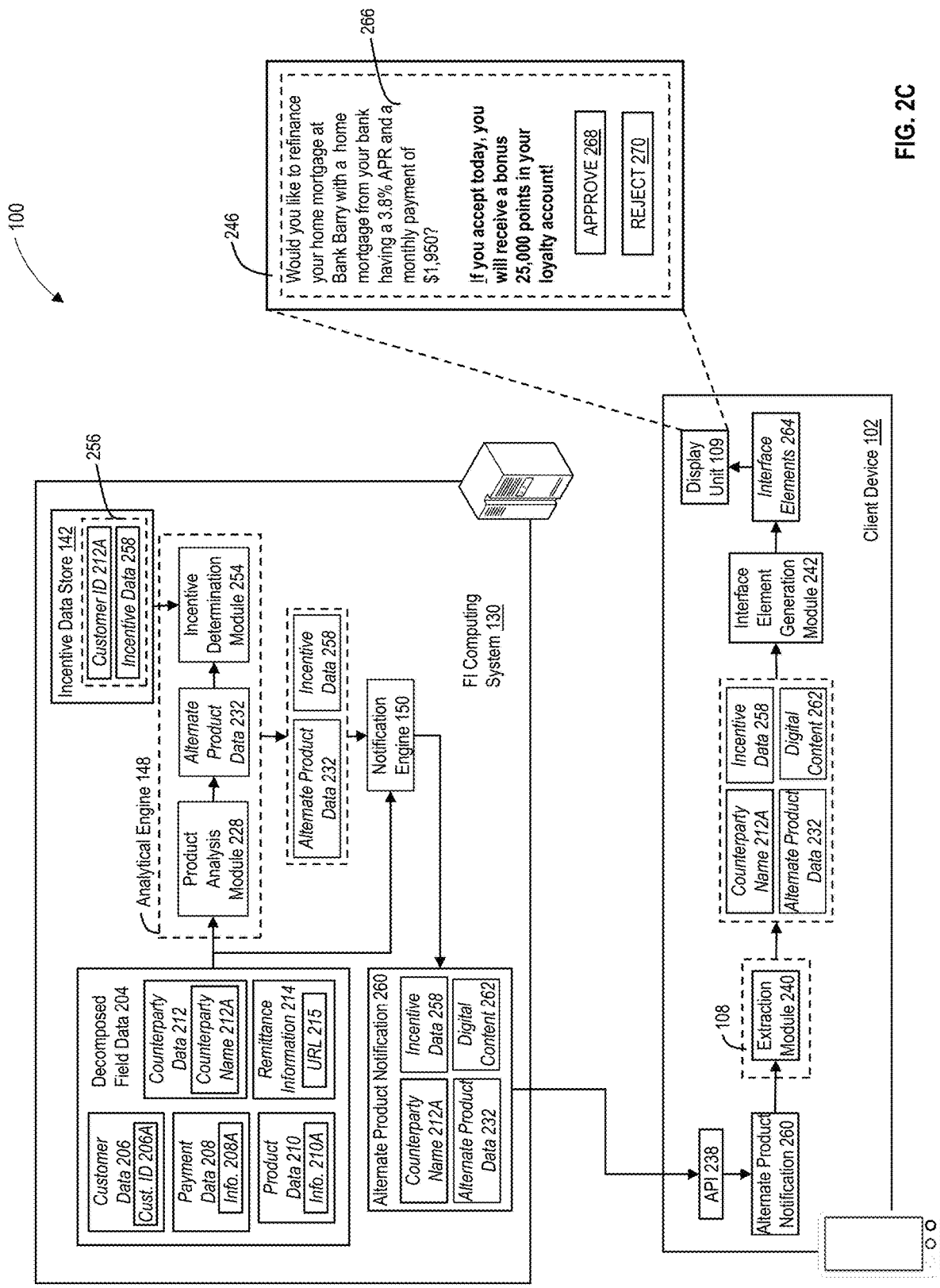

Referring to FIG. 2C, and based on the determination that the terms and conditions of the alternate loan product render the alternative loan product a comparable, or a less favorable alternative, to the loan product issued by the second financial institution, executed product analysis module 228 may provide alternative product data 232 as an input to an incentive generation module 254 of executed analytical engine 148, which may perform any of the exemplary processes described herein to generate additional data 256 identifying and characterizing one or more customer-specific incentives that, if presented to user 101 within notification interface 246 concurrently with portions of alternative product data 232, provide a graphical representation of the alternate loan product and the one or more customer-specific incentives. In some instances, and as described herein, the one or more customer-specific incentives may prompt user 101 to access the offered, alternative loan product associated with the comparable, or less favorable terms and conditions.

For example, executed incentive generation module 254 may receive alternative product data 232, and may perform operations that obtain, among other things, customer identifier 206A of user 101 from customer data 206 of decomposed field data 204. In some instances, executed incentive generation module 254 access incentive data store 142 (e.g., as maintained within data repository 134), and may parse the structured or unstructured data records of incentive data store 142 to identify one or more data records, such as data record 256, that includes or references customer identifier 206A (or an additional customer identifier, such as an alphanumeric login credential, associated with customer identifier 206A), and that includes one or more elements of incentive data 258 that identify and characterize a customer-specific incentive, which may prompt user 101 to accept the offered, alternative loan product associated with the comparable, or less favorable terms and conditions. By way of example, the customer-specific inventive may include, but is not limited to, an offer to deposit, into an account held by user 101 at the first financial institution, a predetermined amount of funds (e.g., $1,000) upon an acceptance by user 101 of the offered alternative loan product, an offer to provide user 101 with a predetermined reward associated with one or more loyalty programs of the by first financial institution (e.g., an offer to provision 15,000 bonus points to an account of user 101 within a corresponding loyalty program), or an offer to update one or more financial products issued by the financial institution and held by user 101 without fees (e.g., an offer to upgrade an existing credit-card account held by user 101 to an enhanced, rewards-based account without fees, etc.). The disclosed embodiments are, however, not limited to these exemplary incentives, and in other examples, the one or more elements of digital content 258 may identify and characterize, any additional or alternate incentive that would be appropriate to the alternate loan product and to a relationship between user 101 and the first financial institution.

In some instances, executed incentive generation module 254 may perform operations that obtain incentive data 258 from data record 256 of incentive data store 142, the store the elements of incentive data 258 within a portion of a locally or remotely accessible data repository, such as within data repository 134 in conjunction with alternate product data 232 (not illustrated in FIG. 2C), and that provide alternative product data 232 and incentive data 258 as inputs to executed notification engine 150. Executed notification engine 150 may receive alternate product data 232, which may include terms and conditions of an alternate loan product, such as data identifying an interest rate and a monthly payment amount, and may receive incentive data 258, which may identify and characterize a customer-specific incentive associated with the alternate loan product. Based on the one or more elements of customer data 206, payment data 208, product data 210, and counterparty data 212 maintained within decomposed field data 204, and based on the elements of alternate product data 232 and incentive data 258, executed notification engine 150 may perform any of the exemplary processes described herein to an alternate product notification 260 that includes portions of alternate product data 232, which identify and characterize the alternate loan product, incentive data, which identify and characterize the customer-specific incentive, and elements of digital content 262 that, when rendered for presentation by one or more application programs executed by client device 102 within a corresponding digital interface, prompts user 101 to accept, or decline, an offer to refinance the loan product issued by the second financial institution using the alternate loan product available for issuance by the first financial institution in view of the customer-specific incentive. By way of example, executed notification engine 150 may package, into corresponding portions of alternate product notification 234, name 212A of the second financial institution (e.g., "Bank Barry"), portions of alternate product data 232 that identify the annual percentage rate (e.g., the 3.8% APR) and the monthly payment (e.g., $1,950) associated with the alternate loan product, along with the identifier of the second financial institution (e.g., the name "Bank Barry"), the loan type of the loan product (e.g., the thirty-year home mortgage), and portions of incentive data 258. As illustrated in FIG. 2B, executed notification engine 150 may perform operations that cause FI computing system 130 to transmit alternate product notification 260 across network 120 to client device 102.

API 282 of client device 102 may receive alternate product notification 260 and route alternate product notification to extraction module 240 of executed mobile banking application 108. As described herein, executed extraction module 240 may receive alternate product notification 260 from API 282, and may parse alternate product notification 260 and obtain name 212A of the second financial institution, alternate product data 232, incentive data 258, and digital content 262. Further, executed extraction module 240 may also provide name 212A, alternate product data 232, incentive data 258, and digital content 262 to executed interface element generation module 242 of executed mobile banking application 108, which may perform operations that generate interface elements 264 based on portions of name 212A, alternate product data 232, incentive data 258, and digital content 262, and that route interface elements 264 to display unit 109A.

In some instances, when rendered for presentation within a corresponding notification interface 246 by display unit 109A, interface elements 264 provide a graphical representation 266 of an offer for the alternate loan product associated with the APR of 3.8% and the $1,950 monthly payment, and customer-specific incentive that offers a bonus of 25,000 points towards a loyalty account held by user 101 if user 101 were to accept the offered alternative loan product, within a single display screen or window, or across multiple display screens or windows, of notification interface 246. For example, interface elements 244 may, when presented within notification interface 246, provide a graphical representation of the alternate loan product and the customer-specific incentive, and prompt user 101 to accept or decline the offered alternate loan product and customer-specific incentive, e.g., based on additional input provided to input device 109B of client device 102 that selects a respective one of an "APPROVE" icon 268 and a "REJECT" icon 270 presented within notification interface 246. For example, user 101 may elect to accept the offered alternate loan product and the customer-specific incentive by providing input (e.g., via input unit 109B) that select the "APPROVE" icon 250, or may decline the offered alternate loan product and the customer-specific incentive by providing input that selects the "REJECT" icon 252.

Figure 3A:
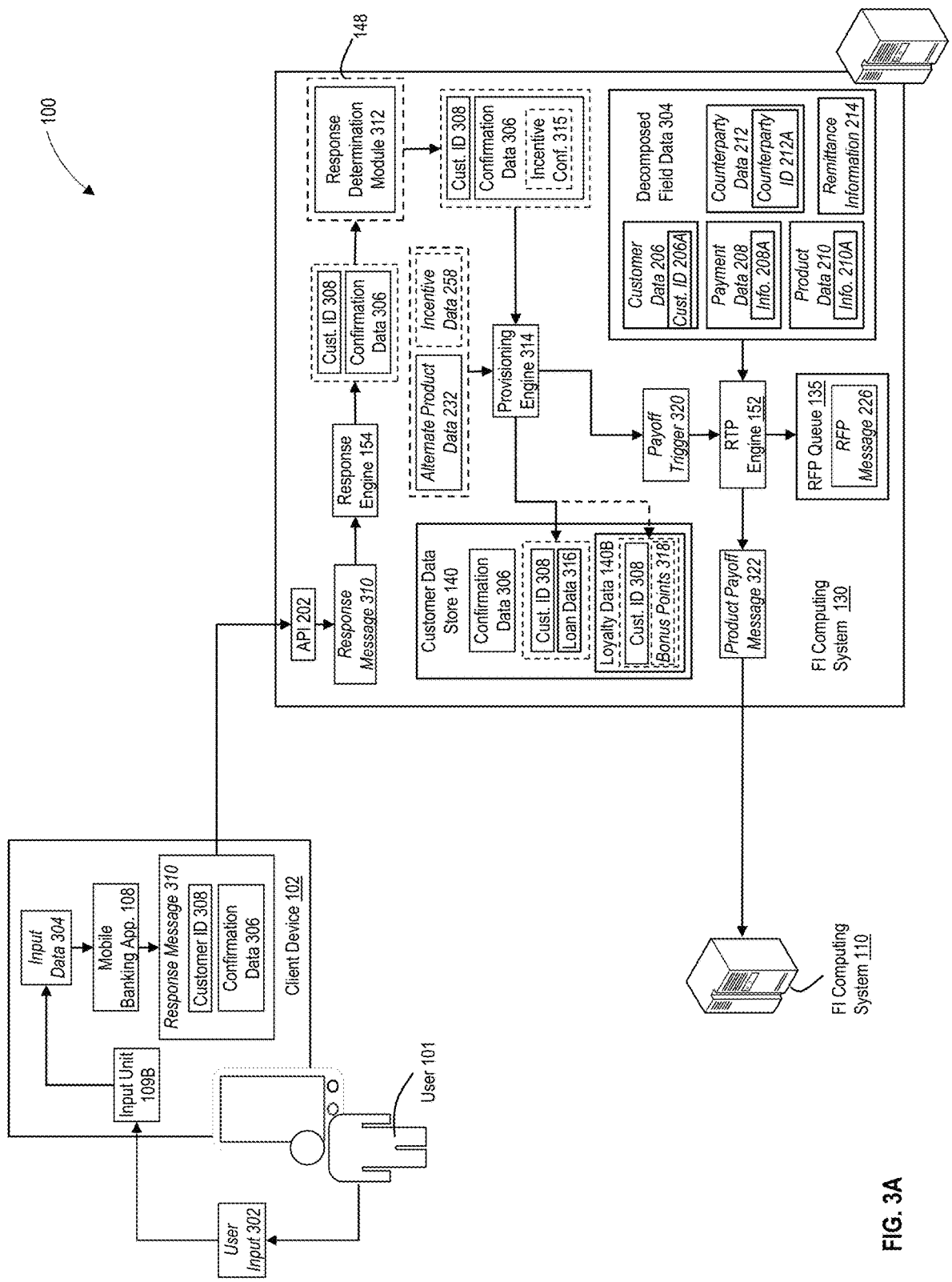

Referring to FIG. 3A, user 101 may provide input 302 via input unit 109B that either accepts, or declines, the offered alternate loan product (e.g., "APPROVE" icon 250 and "REJECT" icon 252) or accepts, or declines, the offered alternate loan product and the customer-specific (e.g., "APPROVE" icon 268 and a "REJECT" icon 270). Input unit 109B may, for example, receive user input 302 and generate input data 304 characterizing user 101's selection, and input unit 109B may route input data 304 to executed mobile banking application 108, which may perform operations that generate elements of confirmation data 306 indicative of the acceptance or rejection of the offered alternative loan product by user 101, or the acceptance or rejection of the alternative loan product in conjunction with the customer-specific incentive by user 101, and that package the elements of confirmation data 306 and a customer identifier 308 of user 101 (e.g., an alphanumeric login credential that uniquely identifies user 101 at FI computing system 130, etc.) into a corresponding portion of a response message 310. Executed mobile banking application 108 may also perform operations that transmit response message 310 across network 120 to FI computing system 130.

API 202 may, for example, receive response message 310 from client device 102, and may route response message 310 to a response engine 154 executed by the one or more processors of FI computing system 130. In some instances, one or more portions of response message 310 may be encrypted (e.g., using a public cryptographic key associated with FI computing system 130), and executed response engine 154 may perform operations that access a corresponding decryption key maintained within the one or more tangible, non-transitory memories of FI computing system 130 (e.g., a private cryptographic key associated with FI computing system 130), and that decrypt the encrypted portions of response message 310 using the corresponding decryption key. Further, executed response engine 154 may also perform operations that process response message 310 and obtain confirmation data 306 and customer identifier 308, and may store the customer identifier 308, which uniquely identifies user 101, and confirmation data 306, which indicates the acceptance or rejection of the offered alternative loan product, or the acceptance or rejection of the alternative loan product in conjunction with the customer-specific incentive by user 101, in a corresponding portion of data repository 134, e.g., within customer data store 140.

Further, executed response engine 154 may also provide customer identifier 308 and confirmation data 306 as inputs to a response determination module 312 of executed analytical engine, which may process confirmation data 306 and determine whether user 101 accepted or rejected of the offered alternative loan product by user 101, or the accepted or rejected of the alternative loan product in conjunction with the customer-specific incentive by user 101. If, for example, executed response determination module 312 were to determine that user 101 accepted the offered alternative loan product, either individually or in conjunction with the customer-specific incentive, executed response determination module 312 may provide confirmation data 306 and customer identifier 308 as an input to a provisioning engine 314 executed by the one or more processors of FI computing system 130 (e.g., based on a programmatic comment generated by executed response determination module 312).

Based on confirmation data 306, executed provisioning engine 314 may access alternate product data 232 and in some instances, incentive data 258, and may perform operations that complete a qualification or underwriting process associated with the alternative loan product an issue the alternative loan product to user 101, e.g., in accordance with the elements of alternate product data 232. In some instances, executed provisioning engine 314 may generate elements of provisioned loan data 316 that, for user 101, specify the terms and conditions of the newly issued, alternative loan product (e.g., the 3.8% annual percentage rate of the fixed-rate home mortgage, the $1,950 monthly payment associated with the fixed-rate home mortgage, etc.), and that store the elements of provisioned loan data 316 within a corresponding portion of customer data store 140 in conjunction with customer identifier 308. Further, and as described herein, when user 101 accepted the offered alternative loan product in conjunction with the customer-specific incentive, executed provisioning engine 314 may detect, within confirmation data 306, an incentive confirmation 315, and executed provisioning engine 314 may perform operations that provision the customer-specific incentive (e.g., the 25,000 bonus loyalty points for user 101's loyalty account), and that store data indicative of the provisioned, customer-specific incentive within customer data store 140, e.g., as bonus point data 318 within loyalty data 140B.

Further, as illustrated in FIG. 3A, executed provisioning engine 314 may generate data, e.g., a payoff trigger 320, indicative of the successful issuance of the alternative loan product to user 101 and route payoff trigger 320 to RTP engine 152 executed by the one or more processors of FI computing system 130 (e.g., based on a programmatic comment generated by executed provisioning engine 314). Executed RTP engine 152 may receive payoff trigger 320, and may perform operations that access data repository 134, and obtain decomposed field data 204 that includes one or more elements of customer data 206, payment data 208, product data 210, counterparty data 212, and remittance information 214 extracted from the structured or unstructured message fields of RFP message 226 and, as such, that characterize the requested payment from user 101 by the second financial institution. Executed RTP engine 152 may, based on the one or more elements of customer data 206, payment data 208, product data 210, counterparty data 212, and remittance information 214, generate a product payoff message 322 to transfer a payoff amount to the second financial institution, e.g., to pay off the home mortgage issued to user 101 by the second financial institution.

For example, product payoff message 322 may include message fields consistent with the ISO 20022 standard for electronic data exchange between financial institutions, and each of the message fields may be populated with data structured and formatted in accordance with the ISO 20022 standard. In some instances, executed RTP engine 152 may perform operations to parse customer data 206 within decomposed field data 204 to obtain the customer identifier 206A of user 101, that parse product data 210 within decomposed field data 204 to obtain product information 210A that identifies the current payoff amount associated with the loan product (e.g., $200,000), and that parse payment data 208 to obtain payment information 208A that identifies the account for payment (e.g., the account of second financial institution available to receive the payment). Executed RTP engine 152 may perform operations to populate product payoff message 322 with the information that includes, but is not limited to, obtained customer identifier 206A, the current payoff amount, and the account for payment in accordance with field mapping data 138A. As illustrated in FIG. 3A, executed RTP engine 152 may perform operations that cause FI computing system 130 to transmit product payoff message 322 across network 120 to FI computing system 110 of the second financial institution, either directly or through one or more computing systems associated with a clearinghouse. Executed RTP engine 152 may also perform operations that access RFP message 226 maintained within RFP queue 135, and delete RFP message 226 from RFP queue 135.

In other examples, based on confirmation data 306, executed response determination module 312 may determine that user 101 declined the offered alternative loan product, either individually or in conjunction with the customer-specific incentive. For instance, and as described below in reference to FIG. 3B, executed response determination module 312 may provide data confirming the declined alternative loan product to executed notification engine 150, which may perform any of the exemplary processes described herein to generate, and provision to client device 102, a payment notification associated with the $2,000 monthly payment requested by the second financial institution (e.g., "Bank Barry") for the loan product issued to user 101.

Figure 3B:
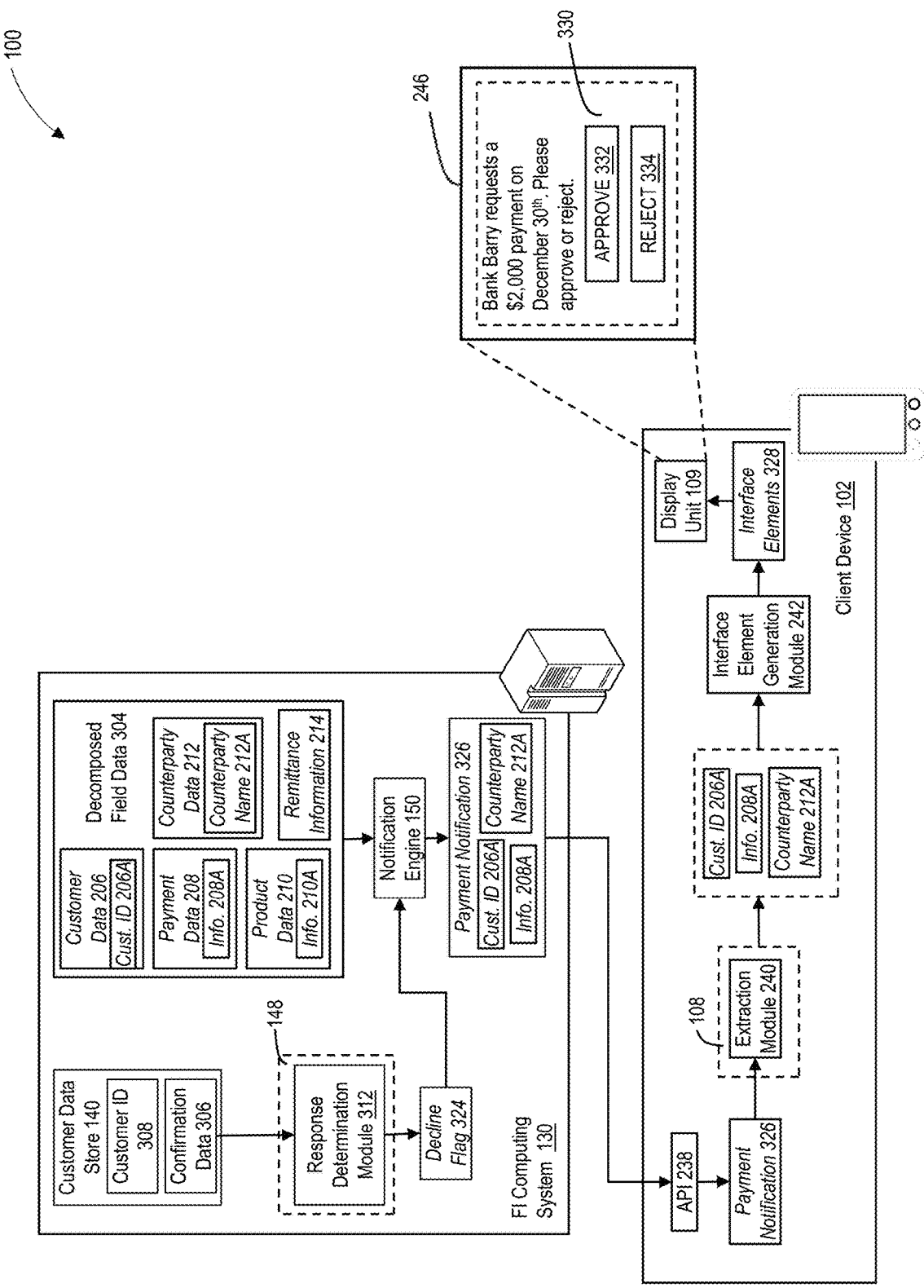

Referring to FIG. 3B, and based on the determination that user 101 declined the offered alternative loan product, executed response determination module 312 may generate data confirming the declined alternative loan product, e.g., a decline flag 324, and provision decline flag 324 as an input to executed notification engine 150. In some instances, executed notification engine 150 may generate a payment notification 326 based on one or more data elements of decomposed field data 204. For example, executed notification engine 150 may perform operations to parse customer data 206 within decomposed field data 204 to obtain the customer identifier 206A of user 101, that parse payment data 208 to obtain payment information 208A that identifies the payment amount (e.g., the requested $2,000 payment amount) and the requested payment date (e.g., a payment due date), and that parse counterparty data 12 to obtain counterparty name 212A (e.g., "Bank Barry"). Executed notification engine 150 may perform additional operations that generate a payment notification 326 that includes include the customer identifier 206A, the portion of payment information 208A that specifies the $2,000 payment amount and a requested payment date (e.g., December $30^{th}$), and counterparty name 212A, and transmit payment notification 326 across network 120 to client device 102.

API 238 of client device 102 may receive payment notification 326 and route payment notification 326 to executed mobile banking application 108. As described herein, a executed extraction module 240 may receive payment notification 326, and perform operations that parse notification data 462 to obtain customer identifier 206A, the portion of payment information 208A that specifies the $2,000 payment amount and a requested payment date, and counterparty name 212A, which executed extraction module 240 may provide as an input to executed interface element generation module 242. In some instances, executed interface element generation module 242 may perform operations that generate one or more interface elements 328 based on customer identifier 206A, the portion of payment information 208A that specifies the $2,000 payment amount and a requested payment date, and counterparty name 212A, and provide interface elements 328 to display unit 109A. When rendered for presentation within notification interface 246 by display unit 109A, interface elements 328 provide a graphical representation 330 of the request for payment within a single display screen or window, or across multiple display screens or windows, of notification interface 246.

For example, interface elements 328 may, when presented within notification interface 246, provide a graphical representation of the request for the $2,000 payment from user 101 by the second financial institution prior to December $30^{th}$, and prompt user 101 to approve or reject the request for payment, e.g., based on additional input provided to input device 109B of client device 102 that selects a respective one of an "APPROVE" icon 332 and a "REJECT" icon 334 presented within notification interface 246. User 101 may elect to approve the requested payment (e.g., to send payment to the second financial institution) by providing input (e.g., via input unit 109B) to select the "APPROVE" icon 332, or may decline the requested payment by providing input to select the "REJECT" icon 334, and client device 102 may perform operations that generate and one or more elements of a payment response indicative of the approved or decline payment, and that transmit the payment response across network 120 to FI computing system 130 (not illustrated in FIG. 3B).

In some instances, not illustrated in FIG. 3B, executed RTP engine 152 may receive the payment response, and based on a determination that user 101 approved the $2,000 requested by Bank Barry, executed RTP engine 152 may perform operations that debit the approved $2,000 payment from an account of user 101 issued by the first financial institution. Further, executed RTP engine 152 may perform operations that access data repository 134, and obtain decomposed field data 204 that includes one or more elements of customer data 206, payment data 208, product data 210, counterparty data 212, and remittance information 214 extracted from the structured or unstructured message fields of RFP message 226 and, as such, that characterize the requested $2,000 payment from user 101 by the second financial institution. Executed RTP engine 152 may, based on the one or more elements of customer data 206, payment data 208, product data 210, counterparty data 212, and remittance information 214, generate a response to RFP message 226 that confirms the approved $2,000 payment by user 101 and the debiting of the $2,000 from the account of user 101. For example, the response may include message fields consistent with the ISO 20022 standard for electronic data exchange between financial institutions, and each of the message fields may be populated with data structured and formatted in accordance with the ISO 20022 standard. In some instances, not illustrated in FIG. 3B, executed RTP engine 152 may perform operations that cause FI computing system 130 to transmit product payoff message 322 across network 120 to FI computing system 110 of the second financial institution, either directly or through one or more computing systems associated with a clearinghouse, and executed RTP engine 152 may also perform operations that access RFP message 226 maintained within RFP queue 135, and delete RFP message 226 from RFP queue 135.

Figure 4:
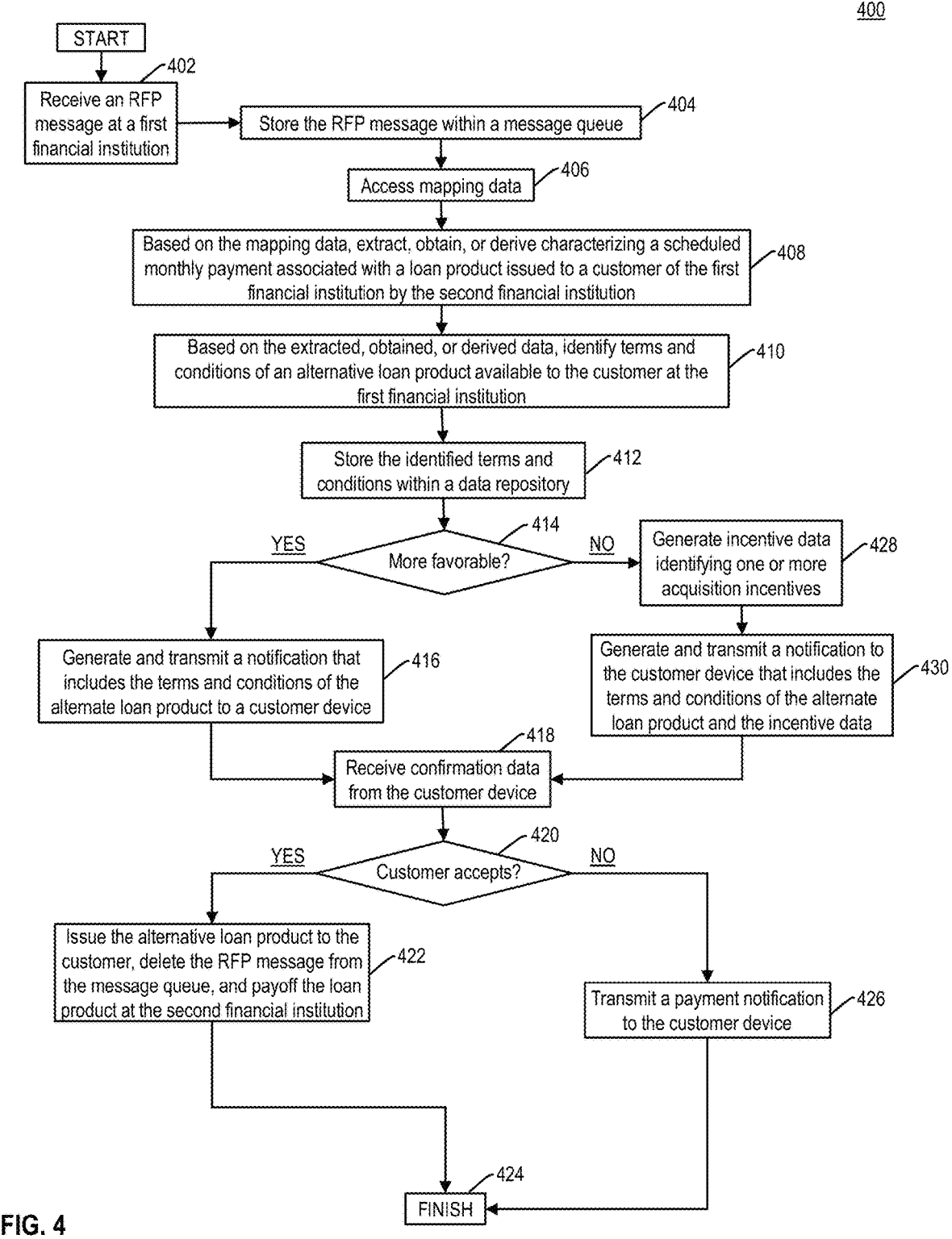
FIG. 4 is a flowchart of an exemplary process an exemplary process for provisioning targeted alternative product data to customer devices based on structured messaging data, in accordance with some exemplary embodiments.

FIG. 4 is a flowchart of an exemplary process 400 for provisioning targeted alternative product data to customer devices based on structured messaging data, in accordance with some exemplary embodiments. For example, one or more computing systems associated with a first financial institution, such as FI computing system 130, may perform one or more of the exemplary steps of exemplary process 400. Referring to FIG. 4, FI computing system 130 may receive an RFP message having message fields structured in accordance with the ISO 20022 standard (e.g., in step 402 of FIG. 4), and may store the received RFP message within a message queue maintained locally by the first financial institution computing system (e.g., in step 404 of FIG. 4). In some instances, the first financial institution computing system may maintain the received RFP message within the message queue until the customer provides input accepting or rejecting the requested monthly payment, or alternatively, until an expiration of a corresponding period of temporal validity.

As described herein, a customer of the first financial institution, such as user 101, may hold a loan product (e.g., a home mortgage, an auto loan, etc.) issued by a second financial institution (e.g., based on operations performed by FI computing system 110), and the structured message fields of the RFP message may be populated with elements of data that identify and characterize a scheduled payment (e.g., monthly payment) on that loan product requested from the customer by the second financial institution. For example, the data within the structured or unstructured message fields of the ISO-20002-compliant RFP message may include, but is not limited to, elements of information that identify the customer, that identify the second financial institution, and that identify and characterize the requested monthly payment and the loan product, such as, but not limited to, the exemplary elements of information described herein. Further, the ISO-20022-compliant RFP message may also include one or more structured or unstructured data fields populated with a link (e.g., a short-form or tiny URL, a long-form URL, etc.) to remittance data associated with the requested payment, such as a link to a PDF or HTML bill or payment stub that includes any of the information described herein that identifies the financial institution requesting payment, the requesting payment, or the loan product.

Responsive to the receipt of the RFP message, FI computing system 130 may access mapping data that identifies and characterizes each of the messages fields within the ISO-20022-compliant RFP message (e.g., in step 406 of FIG. 4). Based on the mapping data, FI computing system 130 may perform any of the exemplary processes described herein to parse and analyze all or a selected subset of the message fields of the RFP message to extract, obtain, or derive discrete elements of data that identify and characterize the customer, the second financial institution requesting the monthly payment, the requested monthly payment, and additionally, or alternatively, the loan product associated with the monthly payment (e.g., in step 408 of FIG. 4). FI computing system 130 may perform additional operations, described herein, that store the extracted, obtained, or derived data elements of field data (e.g., that identify and characterize the customer, the second financial institution, the requested monthly payment, and/or the loan product) within an accessible data repository.

By way of example, FI computing system 130 may perform operations in step 408 that extract at least a subset of the data identifying and characterizing the customer, the second financial institution, the requested monthly payment, and the loan product from the structured or unstructured messages fields of the received RFP message. Examples of the extracted data may include, but are not limited to, the name of the customer, the name of the second financial institution, a payment amount and requested payment date of the requested monthly payment, or information identifying the loan product, such as those portions of the requested payment amount allocated to the escrow account, the principal amount, and the accrued interest.

In other instances, also in step 408, FI computing system 130 may perform any to the exemplary processes described herein to detect, within one or more of the message fields, a link to the remittance data associated with the requested monthly payment (e.g., a link to a PDF or HTML bill or payment stub that includes any of the information described herein that identifies the second financial institution requesting payment, the requested monthly payment, or the loan product). By way of example, the link may correspond to a long-form uniform resource locator (URL) into which certain elements of data may be embedded, such as, but not limited to, a unique identifier of the customer, and FI computing system 130 may perform operations, described herein, that parse the long URL to identify and extract the embedded data.

Additionally, or alternatively, FI computing system 130 may perform any of the exemplary processes described herein that, based on the detected link (e.g., the long-form URL described above, or a shortened URL, such as a tiny URL), programmatically access the remittance data associated with the processed link, e.g., as maintained at an external computing system. The remittance data may include a PDF or HTML bill associated with the requested monthly payment, and the FI computing system may perform operations that process the remittance data (e.g., through an application of an optical character recognition (OCR) process to the PDF bill, parsing code associated with the HTML bill, applying a screen-scraping technology to the bill) to extract the additional or alternate elements of the data that identifies and characterizes the customer, the second financial institution, the requested monthly payment, and/or the loan product. For instance, and based on the processed remittance data, the FI computing system may obtain elements of product data that, among other things, identifies: the type of loan product; the term, interest rate, and principal amount associated with the loan product; a current payoff amount associated with the loan product; and/or those portions of the requested payment amount allocated to the escrow account, the principal amount, and/or the accrued interest.

By way of example, in step 408, FI computing system 130 may extract, obtain, or derive, based on data within the populated message fields of the RFP message, customer data that includes the name of the customer (e.g., "John Q. Stone") and payment data that includes, but is not limited to, the name of the second financial institution, the payment amount of the requested monthly payment (e.g., $2,000), and the requested payment date (e.g., "Dec. 30, 2021"), and those portions of the payment amount allocated to the escrow account (e.g., $500), to pay down the principal amount (e.g., $1,300), and to pay down the accrued interest (e.g., $200). Further, and using any of the processes described herein, FI computing system 130 may also extract, obtain, or derive additional elements of product data that identify and characterize the loan product, such as, but not limited to, the type of loan product (e.g., a home mortgage), the interest rate of the loan product (e.g., 4.2% APR), the principal amount of the loan product (e.g., $270,000), and a current payoff amount associated with the loan product (e.g., $200,000). The FI computing system may then perform operations that store the customer data, the payment data, and the product data within corresponding portions of the locally accessible data repository.

Referring back to FIG. 4, FI computing system 130 may access the locally stored product data (e.g., that identifies and characterizes the fixed, fifteen-year home mortgage having the APR of 4.2%, the principal of $270,000, and the current payoff amount of $200,000, and issued by the second financial institution), and may perform any of the exemplary processes described herein to identify terms and conditions of an alternate loan product available to the customer at the first financial institution (e.g., in step 410 of FIG. 4). In some instances, in step 410, FI computing system 130 may access the locally stored customer data (e.g., as extracted, obtained, or derived from the RFP message), and based on that customer data, obtain additional elements of account or transaction data that characterize the customer's interaction with the first financial institution and one or more additional financial institutions. Additionally, FI computing system 130 may also establish a secure communication channel with a computing system of one or more reporting entities, and obtain additional reporting information that characterizes the customer or the customer's property, such as, but not limited to, a credit score of the customer or a current assessed value of the customer's home.

For example, in step 410, FI computing system 130 may apply one or more internal qualification or underwriting processes (e.g., associated with and specified by the first financial institution) to the accessed customer, account, or transaction data, and to the obtained additional reporting data, and based on the application of the one or more internal qualification or underwriting processes, determine the terms and conditions of the alternative loan product available to the customer. FI computing system 130 may perform further operations that package the determined terms and conditions for the alternate loan product into corresponding portions of alternative product data, which FI computing system 130 may store within an accessible data repository (e.g., in step 412 of FIG. 4).

For example, and based on the application of the one or more internal qualification or underwriting processes, FI computing system 130 may identify, as an alternate loan product, a fixed-rate home mortgage having the APR of 3.8%, a principal of $200,000, and an estimated monthly payment of $1,950. Based on a comparison between the product data extracted, obtained or derived from the RFP message (e.g., that characterizes the loan product issued by the second financial institution), and the alternate product data identifying the terms and conditions of the additional loan product available to the customer at the first financial institution, the FI computing system may determine whether the terms and conditions of the alternative loan product available at the first financial institution are more favorable than comparable terms and conditions associated with the loan product issued by the second financial institution (e.g., in step 414 of FIG. 4).

In some instances, and based on the determination that the terms and conditions of the alternative loan product available are more favorable than the terms and conditions associated with the loan product issued by the second financial institution (e.g., step 414; YES), FI computing system 130 may perform any of the exemplary processes described herein to generate an alternative product notification that identifies the terms and conditions of the alternative, and more favorable, loan product, and may transmit that generated payment notification to a device of the customer for presentation within a digital interface associated with the first financial institution (e.g., in step 416 of FIG. 4). The customer device may, for example, process, render, and present the notification to the customer within the digital interface, and the presented notification may indicate that the first financial institution intercepted the RFP message and that the second financial institution requested a monthly payment of $2,000 on the 4.2% APR home mortgage, and may further indicate that the first financial institution can provide a similar home mortgage with an APR of 3.8% and a monthly payment of $1,950. The presented notification may also include additional interface elements that prompt the customer to provide, to the customer device, additional input accepting the terms and conditions of the alternative loan product, or declining the offer of the alternative loan product.

For example, the customer may, based on the presented APR and monthly payment, elect to accept the terms and conditions of the alternative loan product, and formally apply for that alternative loan product at the first financial institution. The customer may provide additional input to the customer device that selects a corresponding one of the additional interface elements, and the customer device may transmit confirmation data indicative of the selected one of the additional interface elements, and the customer's election to apply for the alternative loan product, to FI computing system 130. In other instances, if the customer were to decline the offer of the alternative loan product, the customer may provide further input to the customer device that selects a corresponding one of the additional interface elements, and the customer device may transmit further confirmation data indicative of the declined offer to FI computing system 130.

FI computing system 130 may receive the confirmation data (e.g., in step 418 of FIG. 4), and perform any of the exemplary processes described herein to determine whether the confirmation data is indicative of the customer's decision to accept, or decline, the offer of the alternative loan product (e.g., in step 420 of FIG. 4). If the customer were to accept the offer of the alternative loan product (e.g., step 420; YES), FI computing system 130 may perform any of the exemplary processes described herein to complete a qualification or underwriting process and issue the alternative loan product to the customer (e.g., in step 422 of FIG. 4). FI computing system 130 may perform any of the exemplary processes described herein, in step 422, to cancel the RFP issued by the second financial institution, delete the RFP message from the message queue, and to transfer the payoff amount to the second financial institution, e.g., via an ISO-20022-compliant message that "pays off" the prior home mortgage issued by the second financial institution. Exemplary process 400 may then be complete in step 424.

In other instances, if the customer were to decline the offer of the alternative loan product (e.g., step 420; NO), FI computing system may perform operations that transmit or "push" a payment notification associated with that RFP message to the customer device for presentation within the digital interface (e.g., in step 426 of FIG. 4). As described herein, client device 102 may present interface elements within the digital interface that identify the requested monthly payment of $2,000 and requested payment date of Dec. 30, 2021, and prompt the customer to provide further input to the customer device that approves, denies, or defers the requested monthly payment, which the customer device may transmit to the FI computing system.

Referring back to step 414, FI computing system 130 may perform any of the exemplary processes described herein to establish that the terms and conditions of the alternative loan product are equivalent to, or in some instances, less favorable, than the terms and conditions of the financial product held by the customer and issued by the second financial institution (e.g., step 414; NO). To facilitate that acquisition of the alternative loan product, FI computing system 130 may perform operations that generate incentive data identifying one or more customer-specific incentives appropriate to the customer, the existing relationship, and/or the alternative loan product (e.g., in step 428 of FIG. 4). As described herein, the one or more customer-specific incentives may include, but are not limited to, a payment of a predetermined amount (e.g., $1,000) that incentivizes the customer to accept the alternative loan product, a deferral period on payments associated with the alternative loan, or disbursements of loyalty or rewards points that incentivizes the customer to switch to the alternative loan product).

In some instances, the FI computing system may generate an additional alternative product notification that identifies the terms and conditions of the alternative loan product and that includes the incentive data, and may transmit that additional alternative product notification to the customer device for presentation within the digital interface associated with the first financial institution (e.g., in step 430 of FIG. 4). As described herein, the customer device may, for example, process, render, and present the additional notification to the customer within the digital interface, and the presented notification may include the terms and conditions of the alternative loan product and the one or more customer-specific incentives. The presented notification may also include additional interface elements that prompt the customer to provide, to the customer device, additional input accepting the terms and conditions of the alternative loan product, or declining the offer of the alternative loan product, as described herein. Exemplary process 400 may pass back to step 418, and FI computing system 130 may perform operations that receive confirmation data indicative of the customer's acceptance, or rejection, of the alternative loan product in conjunction with the one or more customer-specific incentives.

C. Exemplary Hardware and Software Implementations

Embodiments of the subject matter and the functional operations described in this disclosure can be implemented in digital electronic circuitry, in tangibly-embodied computer software or firmware, in computer hardware, including the structures disclosed in this specification and their structural equivalents, or in combinations of one or more of them. Embodiments of the subject matter described in this disclosure, including, but not limited to, web browser 107, mobile banking application 108, decomposition engine 146, analytical engine 148, notification engine 150, real-time payment engine 152, response engine 154, application programming interfaces (APIs) 202 and 238, remittance analysis engine 216, product analysis module 228, extraction module 240, interface element generation module 242, incentive determination module 254, response determination module 312, and provisioning engine 314, can be implemented as one or more computer programs, i.e., one or more modules of computer program instructions encoded on a tangible non-transitory program carrier for execution by, or to control the operation of, a data processing apparatus (or a computing system). Additionally, or alternatively, the program instructions can be encoded on an artificially-generated propagated signal, such as a machine-generated electrical, optical, or electromagnetic signal that is generated to encode information for transmission to suitable receiver apparatus for execution by a data processing apparatus. The computer storage medium can be a machine-readable storage device, a machine-readable storage substrate, a random or serial access memory device, or a combination of one or more of them The terms "apparatus," "device," and "system" refer to data processing hardware and encompass all kinds of apparatus, devices, and machines for processing data, including by way of example a programmable processor, a computer, or multiple processors or computers. The apparatus, device, or system can also be or further include special purpose logic circuitry, such as an FPGA (field programmable gate array) or an ASIC (application-specific integrated circuit). The apparatus, device, or system can optionally include, in addition to hardware, code that creates an execution environment for computer programs, such as code that constitutes processor firmware, a protocol stack, a database management system, an operating system, or a combination of one or more of them.

A computer program, which may also be referred to or described as a program, software, a software application, a module, a software module, a script, or code, can be written in any form of programming language, including compiled or interpreted languages, or declarative or procedural languages, and it can be deployed in any form, including as a stand-alone program or as a module, component, subroutine, or other unit suitable for use in a computing environment. A computer program may, but need not, correspond to a file in a file system. A program can be stored in a portion of a file that holds other programs or data, such as one or more scripts stored in a markup language document, in a single file dedicated to the program in question, or in multiple coordinated files, such as files that store one or more modules, sub-programs, or portions of code. A computer program can be deployed to be executed on one computer or on multiple computers that are located at one site or distributed across multiple sites and interconnected by a communication network.

The processes and logic flows described in this specification can be performed by one or more programmable computers executing one or more computer programs to perform functions by operating on input data and generating output. The processes and logic flows can also be performed by, and apparatus can also be implemented as, special purpose logic circuitry, such as an FPGA (field programmable gate array) or an ASIC (application-specific integrated circuit).

Computers suitable for the execution of a computer program include, by way of example, general or special purpose microprocessors or both, or any other kind of central processing unit. Generally, a central processing unit will receive instructions and data from a read-only memory or a random-access memory or both. The essential elements of a computer are a central processing unit for performing or executing instructions and one or more memory devices for storing instructions and data. Generally, a computer will also include, or be operatively coupled to receive data from or transfer data to, or both, one or more mass storage devices for storing data, such as magnetic, magneto-optical disks, or optical disks. However, a computer need not have such devices. Moreover, a computer can be embedded in another device, such as a mobile telephone, a personal digital assistant (PDA), a mobile audio or video player, a game console, a Global Positioning System (GPS) or an assisted Global Positioning System (AGPS) receiver, or a portable storage device, such as a universal serial bus (USB) flash drive, to name just a few.

Computer-readable media suitable for storing computer program instructions and data include all forms of non-volatile memory, media and memory devices, including by way of example semiconductor memory devices, such as EPROM, EEPROM, and flash memory devices; magnetic disks, such as internal hard disks or removable disks; magneto-optical disks; and CD-ROM and DVD-ROM disks. The processor and the memory can be supplemented by, or incorporated in, special purpose logic circuitry.

To provide for interaction with a user, such as user 101, embodiments of the subject matter described in this specification can be implemented on a computer having a display device, such as a CRT (cathode ray tube) or LCD (liquid crystal display) monitor, for displaying information to the user and a keyboard and a pointing device, such as a mouse or a trackball, by which the user can provide input to the computer. Other kinds of devices can be used to provide for interaction with a user as well; for example, feedback provided to the user can be any form of sensory feedback, such as visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's device in response to requests received from the web browser.

Implementations of the subject matter described in this specification can be implemented in a computing system that includes a back-end component, such as a data server, or that includes a middleware component, such as an application server, or that includes a front-end component, such as a client computer having a graphical user interface or a Web browser through which a user can interact with an implementation of the subject matter described in this specification, or any combination of one or more such back-end, middleware, or front-end components. The components of the system can be interconnected by any form or medium of digital data communication, such as a communication network. Examples of communication networks include a local area network (LAN) and a wide area network (WAN), such as the Internet.

The computing system can include clients and servers. A client and server are generally remote from each other and typically interact through a communication network. The relationship of client and server arises by virtue of computer programs running on the respective computers and having a client-server relationship to each other. In some implementations, a server transmits data, such as an HTML page, to a user device, such as for purposes of displaying data to and receiving user input from a user interacting with the user device, which acts as a client. Data generated at the user device, such as a result of the user interaction, can be received from the user device at the server.

While this specification includes many specifics, these should not be construed as limitations on the scope of the disclosure or of what may be claimed, but rather as descriptions of features specific to particular embodiments of the disclosure. Certain features that are described in this specification in the context of separate embodiments may also be implemented in combination in a single embodiment. Conversely, various features that are described in the context of a single embodiment may also be implemented in multiple embodiments separately or in any suitable sub-combination. Moreover, although features may be described above as acting in certain combinations and even initially claimed as such, one or more features from a claimed combination may in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems may generally be integrated together in a single software product or packaged into multiple software products.

In each instance where an HTML file is mentioned, other file types or formats may be substituted. For instance, an HTML file may be replaced by an XML, JSON, plain text, or other types of files. Moreover, where a table or hash table is mentioned, other data structures (such as spreadsheets, relational databases, or structured files) may be used.

Various embodiments have been described herein with reference to the accompanying drawings. It will, however, be evident that various modifications and changes may be made thereto, and additional embodiments may be implemented, without departing from the broader scope of the disclosed embodiments as set forth in the claims that follow.

Further, unless otherwise specifically defined herein, all terms are to be given their broadest possible interpretation including meanings implied from the specification as well as meanings understood by those skilled in the art and/or as defined in dictionaries, treatises, etc. It is also noted that, as used in the specification and the appended claims, the singular forms "a," "an," and "the" include plural referents unless otherwise specified, and the terms "comprises" and/or "comprising," when used in this specification, specify the presence or addition of one or more other features, aspects, steps, operations, elements, components, and/or groups thereof. Moreover, the terms "couple," "coupled," "operatively coupled," "operatively connected," and the like should be broadly understood to refer to connecting devices or components together either mechanically, electrically, wired, wirelessly, or otherwise, such that the connection allows the pertinent devices or components to operate (e.g., communicate) with each other as intended by virtue of that relationship. In this disclosure, the use of "or" means "and/or" unless stated otherwise. Furthermore, the use of the term "including," as well as other forms such as "includes" and "included," is not limiting. In addition, terms such as "element" or "component" encompass both elements and components comprising one unit, and elements and components that comprise more than one subunit, unless specifically stated otherwise. Additionally, the section headings used herein are for organizational purposes only and are not to be construed as limiting the described subject matter.

The foregoing is provided for purposes of illustrating, explaining, and describing embodiments of this disclosure. Modifications and adaptations to the embodiments will be apparent to those skilled in the art and may be made without departing from the scope or spirit of the disclosure.

What is claimed is:

1. An apparatus comprising:
   a communications interface;
   a memory storing instructions; and
   at least one processor coupled to the communications interface and to the memory, the at least one processor being configured to execute the instructions to:
   receive, via the communications interface, a message comprising elements of message data disposed within corresponding message fields, the message data characterizing a real-time payment requested by a first counterparty from a second counterparty, the real-time payment being associated with a first product provisioned to the second counterparty by the first counterparty, and the elements of the message data comprising one or more first parameter values that characterize the first product;
   determine that a second product is available to the second counterparty based on one or more of the elements of the message data;
   transmit, via the communications interface, first notification data to a device operable by the second counterparty, the first notification data comprising product data that includes one or more second parameter values characterizing the second product, and the first notification data causing an application program executed at the device to present at least a portion of the product data within a digital interface; and receive, via the communications interface, a response to the first notification data from the device, and based on the response, perform operations that provision the second product to the second counterparty in accordance with the one or more second parameter values.

2. The apparatus of claim 1, wherein:

the elements of the message data comprise a first identifier of the first counterparty, a second identifier of the second counterparty, and the one or more first parameter values that characterize the first product; and the at least one processor is further configured to execute the instructions to:

store the received message within a message queue; and determine the one or more second parameter values that characterize the second product based on the one or more first parameter values.

3. The apparatus of claim 2, wherein the first notification data further comprises the first identifier and at least one of the first parameter values, and wherein the first notification data causes the executed application program to present the first identifier and the at least one of the first parameter values within the digital interface.

4. The apparatus of claim 2, wherein the at least one processor is further configured to execute the instructions to:

obtain, from the memory, mapping data associated with the message fields of the received message;

perform operations that obtain the elements of the message data from the message fields based on the mapping data; and store the elements of the message data within the memory.

5. The apparatus of claim 4, wherein:

the received message comprises a request-for-payment message, the message fields of the request-for-payment message being structured in accordance with a standardized data-exchange protocol; and elements of the mapping data identify corresponding ones of the elements of the message data and corresponding ones of the message fields.

6. The apparatus of claim 2, wherein the at least one processor is further configured to execute the instructions to:

determine that at least one of the first parameter values exceeds a corresponding one of the second parameter values; and based on the determination that the at least one of the first parameter values exceeds the corresponding one of the second parameter values, transmit the first notification data to the device via the communications interface.

7. The apparatus of claim 2, wherein the at least one processor is further configured to execute the instructions to:

determine that at least one of the first parameter values fails to exceed a corresponding one of the second parameter values; and based on the determination that the at least one of the first parameter values fails to exceed the corresponding one of the second parameter values, obtain incentive data characterizing a third product available to the second counterparty;

generate second notification data that include the product data and the incentive data, and transmit the second notification data to the device via the communications interface, the second notification data causing the executed application program to present at least a portion of the product data and the incentive data within the digital interface.

8. The apparatus of claim 7, wherein the at least one processor is further configured to execute the instructions to:

receive, via the communications interface, a response to the second notification data from the device; and based on the response, perform operations that provision the second product to the second counterparty in accordance with the one or more second parameter values, and that provision the third product to the second counterparty based on portion of the incentive data.

9. The apparatus of claim 2, wherein:

the first notification data is associated with an offer to provision the second product to the second counterparty in accordance with the one or more second parameter values;

the response to the first notification data is associated with an acceptance of the offer to provision the second product to the second counterparty; and the at least one processor is further configured to execute the instructions to, based on the acceptance of the offer, perform operations that provision the second product to the second counterparty in accordance with the one or more second parameter values, and that delete the stored message within the message queue.

10. The apparatus of claim 1, wherein the at least one processor is further configured to execute the instructions to:

based on the provisioning of the second product to the second counterparty, generate an additional message associated with the real-time payment, the additional message comprising message fields structured in accordance with a standardized data-exchange protocol, and the message fields comprising information identifying the provisioned second product; and transmit the additional message a computing system associated with the first counterparty via the communications interface.

11. A computer-implemented method, comprising:

receiving, using at least one processor, a message comprising elements of message data disposed within corresponding message fields, the message data characterizing a real-time payment requested by a first counterparty from a second counterparty, the real-time payment being associated with a first product provisioned to the second counterparty by the first counterparty, and the elements of the message data comprising one or more first parameter values that characterize the first product;

determining, using the at least one processor, that a second product is available to the second counterparty based on one or more of the elements of the message data;

transmitting, using the at least one processor, first notification data to a device operable by the second counterparty, the first notification data comprising product data that includes one or more second parameter values characterizing the second product, and the first notification data causing an application program executed at the device to present at least a portion of the product data within a digital interface; and receiving, using the at least one processor, a response to the first notification data from the device, and based on the response, performing operations, using the at least one processor, that provision the second product to the second counterparty in accordance with the one or more second parameter values.

12. The computer-implemented method of claim 11, wherein:
the elements of the message data comprise a first identifier of the first counterparty, a second identifier of the second counterparty, and the one or more first parameter values that characterize the first product; and
the computer-implemented method further comprises:
storing, using the at least one processor, the received message within a message queue; and
determining, using the at least one processor, the one or more second parameter values that characterize the second product based on the one or more first parameter values.

13. The computer-implemented method of claim 12, wherein the first notification data further comprises the first identifier and at least one of the first parameter values, and wherein the first notification data causes the executed application program to present the first identifier and the at least one of the first parameter values within the digital interface.

14. The computer-implemented method of claim 12, further comprising:
obtaining, using the at least one processor, and from a data repository, mapping data associated with the message fields of the received message;
performing, using the at least one processor, operations that obtain the elements of the message data from the message fields based on the mapping data; and
storing, using the at least one processor, the elements of the message data within the data repository.

15. The computer-implemented method of claim 14, wherein:
the received message comprises a request-for-payment message, the message fields of the request-for-payment message being structured in accordance with a standardized data-exchange protocol; and
elements of the mapping data identify corresponding ones of the elements of the message data and corresponding ones of the message fields.

16. The computer-implemented method of claim 12, wherein:
the computer-implemented method further comprises determining, using the at least one processor, that at least one of the first parameter values exceeds a corresponding one of the second parameter values; and
the transmitting comprises transmitting the first notification data to the device based on the determination that the at least one of the first parameter values exceeds the corresponding one of the second parameter values.

17. The computer-implemented method of claim 12, wherein:
the computer-implemented method further comprises:
determining, using the at least one processor, that at least one of the first parameter values fails to exceed a corresponding one of the second parameter values;
based on the determination that the at least one of the first parameter values fails to exceed the corresponding one of the second parameter values, obtaining, using the at least one processor, incentive data characterizing a third product available to the second counterparty; and
generating, using the at least one processor, second notification data that include the product data and the incentive data, and
the transmitting comprises transmitting the second notification data to the device, the second notification data causing the executed application program to present at least a portion of the product data and the incentive data within the digital interface.

18. The computer-implemented method of claim 17, further comprising:
receiving, using the at least one processor, a response to the second notification data from the device; and
based on the response, performing operations, using the at least one processor, that provision the second product to the second counterparty in accordance with the one or more second parameter values, and that provision the third product to the second counterparty based on portion of the incentive data.

19. The computer-implemented method of claim 12, wherein:
the first notification data is associated with an offer to provision the second product to the second counterparty in accordance with the one or more second parameter values;
the response to the first notification data is associated with an acceptance of the offer to provision the second product to the second counterparty; and
the computer-implemented method further comprises performing operations, using the at least one processor, that provision the second product to the second counterparty in accordance with the one or more second parameter values, and that delete the stored message within the message queue.

20. A tangible, non-transitory computer-readable medium storing instructions that, when executed by at least one processor, cause the at least one processor to perform a method, comprising:
receiving a message comprising elements of message data disposed within corresponding message fields, the message data characterizing a real-time payment requested by a first counterparty from a second counterparty, and the real-time payment being associated with a first product provisioned to the second counterparty by the first counterparty, and the elements of the message data comprising one or more first parameter values that characterize the first product;
determining that a second product is available to the second counterparty based on one or more of the elements of the message data;
transmitting notification data to a device operable by the second counterparty, the notification data comprising product data that includes one or more second parameter values characterizing the second product, and the notification data causing an application program executed at the device to present at least a portion of the product data within a digital interface; and
receiving a response to the notification data from the device, and based on the response, performing operations that provision the second product to the second counterparty in accordance with the one or more second parameter values.

21. The apparatus of claim 1, wherein the at least one processor is further configured to execute the instructions to:
store the received message within a message queue; and
based on the provisioning of the second product to the second counterparty in accordance with the one or more second parameter values, delete the stored message within the message queue.

22. The apparatus of claim 1, wherein:

the second product comprises an alternative to the first product; and the at least one processor is further configured to execute the instructions to:

determine the one or more first parameter values based on one or more of the elements of the message data, and determine the one or more second parameter values based on the one or more first parameter values; and determine that the second product is available to the second counterparty based on a comparison between at least one of the first parameter values and a corresponding one of the second parameter values.

\* \* \* \* \*